(12) United States Patent
Miller

(10) Patent No.: US 8,145,358 B2
(45) Date of Patent: Mar. 27, 2012

(54) METHOD AND SYSTEM FOR DETECTING ABNORMAL OPERATION OF A LEVEL REGULATORY CONTROL LOOP

(75) Inventor: John P. Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1005 days.

(21) Appl. No.: 11/492,577

(22) Filed: Jul. 25, 2006

(65) Prior Publication Data

US 2008/0125879 A1      May 29, 2008

(51) Int. Cl.
*G05D 9/00* (2006.01)
(52) U.S. Cl. ............... 700/281; 700/21; 700/29; 700/80
(58) Field of Classification Search ............... 700/21, 700/29, 30, 32, 80, 282, 79, 281; 702/51
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |

(Continued)

FOREIGN PATENT DOCUMENTS

EP      0 612 039 A2    8/1994

(Continued)

OTHER PUBLICATIONS

International Search Report and Written Opinion for International Application No. PCT/US2007/074358, dated Apr. 3, 2008.

(Continued)

*Primary Examiner* — Kakali Chaki
*Assistant Examiner* — Nathan Laughlin
(74) *Attorney, Agent, or Firm* — Marshall, Gerstein & Borun LLP

(57) ABSTRACT

A system facilitates detecting an abnormal operation associated with a level regulatory control loop in a process plant. A model for modeling at least a portion of the level regulatory control loop may be utilized with respect to first and second signals associated with regulatory control of a level of material in a tank. The model may include a first regression model in a first range corresponding to a first operating region of the level regulatory control loop. The model may be capable of being subsequently configured to include at least a second regression model in at least a second respective range corresponding to at least a second respective operating region different than the first operating region. The model may generate a prediction of the second signal as a function of first signal. It may be determined whether the second signal significantly deviates from the prediction of the second signal generated by the model. If there is a significant deviation, this may indicate an abnormal operation associated with the level regulatory control loop.

24 Claims, 22 Drawing Sheets

U.S. PATENT DOCUMENTS

| | | | |
|---|---|---|---|
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,189,232 A | 2/1993 | Shabtai et al. | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,311,562 A | 5/1994 | Palusamy et al. | |
| 5,325,522 A | 6/1994 | Vaughn | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,461,570 A | 10/1995 | Wang et al. | |
| 5,483,138 A | 1/1996 | Shmookler et al. | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,499,188 A | 3/1996 | Kline, Jr. et al. | |
| 5,519,647 A | 5/1996 | DeVille | |
| 5,521,842 A | 5/1996 | Yamoda | |
| 5,533,413 A | 7/1996 | Kobayashi et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,552,984 A | 9/1996 | Crandall et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,640,493 A | 6/1997 | Skeirik | |
| 5,666,297 A | 9/1997 | Britt et al. | |
| 5,675,253 A | 10/1997 | Smith et al. | |
| 5,680,409 A | 10/1997 | Qin et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,719,767 A | 2/1998 | Jang | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,764,891 A | 6/1998 | Warrior | |
| 5,768,119 A | 6/1998 | Havekost et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,817,958 A * | 10/1998 | Uchida et al. | 73/865.9 |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,859,964 A | 1/1999 | Wang et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 6,008,985 A | 12/1999 | Lake et al. | |
| 6,014,598 A | 1/2000 | Duyar et al. | |
| 6,017,143 A | 1/2000 | Eryurek et al. | |
| 6,026,352 A | 2/2000 | Burns et al. | |
| 6,033,257 A | 3/2000 | Lake et al. | |
| 6,041,263 A | 3/2000 | Boston et al. | |
| 6,047,220 A | 4/2000 | Eryurek | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,102,164 A | 8/2000 | McClintock et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,119,047 A | 9/2000 | Eryurek et al. | |
| 6,122,555 A | 9/2000 | Lu | |
| 6,128,279 A | 10/2000 | O'Neil et al. | |
| 6,144,952 A | 11/2000 | Keeler et al. | |
| 6,169,980 B1 | 1/2001 | Keeler et al. | |
| 6,224,121 B1 | 5/2001 | Laubach | |
| 6,246,950 B1 | 6/2001 | Bessler et al. | |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |
| 6,317,701 B1 | 11/2001 | Pyotsia et al. | |
| 6,332,110 B1 | 12/2001 | Wolfe | |
| 6,397,114 B1 | 5/2002 | Eryurek et al. | |
| 6,421,571 B1 | 7/2002 | Spriggs et al. | |
| 6,445,963 B1 | 9/2002 | Blevins et al. | |
| 6,532,392 B1 | 3/2003 | Eryurek et al. | |
| 6,539,267 B1 | 3/2003 | Eryurek et al. | |
| 6,594,589 B1 | 7/2003 | Coss, Jr. et al. | |
| 6,609,036 B1 | 8/2003 | Bickford | |
| 6,615,090 B1 | 9/2003 | Blevins et al. | |
| 6,633,782 B1 | 10/2003 | Schleiss et al. | |
| 6,795,798 B2 | 9/2004 | Eryurek et al. | |
| 6,901,300 B2 | 5/2005 | Blevins et al. | |
| 6,954,721 B2 | 10/2005 | Webber | |
| 7,079,984 B2 | 7/2006 | Eryurek et al. | |
| 7,085,610 B2 * | 8/2006 | Eryurek et al. | 700/29 |
| 7,221,988 B2 | 5/2007 | Eryurek et al. | |
| 7,233,834 B2 | 6/2007 | McDonald, Jr. et al. | |
| 7,269,599 B2 | 9/2007 | Andreev et al. | |
| 7,321,848 B2 | 1/2008 | Tuszynski | |

| | | |
|---|---|---|
| 7,526,405 B2 | 4/2009 | Miller |
| 7,567,887 B2 | 7/2009 | Emigholz et al. |
| 7,657,399 B2 | 2/2010 | Miller et al. |
| 7,912,676 B2 | 3/2011 | Miller |
| 2002/0022894 A1 | 2/2002 | Eryurek et al. |
| 2002/0038156 A1 | 3/2002 | Eryurek et al. |
| 2002/0077711 A1 | 6/2002 | Nixon et al. |
| 2002/0107858 A1 | 8/2002 | Lundahl et al. |
| 2002/0123864 A1* | 9/2002 | Eryurek et al. ............... 702/188 |
| 2002/0133320 A1 | 9/2002 | Wegerich et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0014500 A1 | 1/2003 | Schleiss et al. |
| 2003/0074159 A1 | 4/2003 | Bechhoefer et al. |
| 2004/0039556 A1 | 2/2004 | Chan et al. |
| 2004/0064465 A1 | 4/2004 | Yadav et al. |
| 2004/0078171 A1 | 4/2004 | Wegerich et al. |
| 2004/0168108 A1 | 8/2004 | Chan et al. |
| 2005/0060103 A1 | 3/2005 | Chamness |
| 2005/0143873 A1 | 6/2005 | Wilson |
| 2005/0197792 A1 | 9/2005 | Haeuptle |
| 2005/0210337 A1 | 9/2005 | Chester et al. |
| 2005/0246149 A1 | 11/2005 | Tuszynski |
| 2005/0256601 A1 | 11/2005 | Lee et al. |
| 2006/0020423 A1 | 1/2006 | Sharpe |
| 2006/0052991 A1 | 3/2006 | Pflugl et al. |
| 2006/0067388 A1 | 3/2006 | Sedarat |
| 2006/0074598 A1 | 4/2006 | Emigholz et al. |
| 2006/0157029 A1 | 7/2006 | Suzuki et al. |
| 2006/0200549 A1 | 9/2006 | Soto et al. |
| 2006/0265625 A1 | 11/2006 | Dubois et al. |
| 2007/0005298 A1 | 1/2007 | Allen et al. |
| 2007/0097873 A1 | 5/2007 | Ma et al. |
| 2007/0109301 A1 | 5/2007 | Smith |
| 2008/0027677 A1 | 1/2008 | Miller et al. |
| 2008/0027678 A1 | 1/2008 | Miller |
| 2008/0052039 A1 | 2/2008 | Miller et al. |
| 2008/0082295 A1 | 4/2008 | Kant et al. |
| 2008/0082304 A1 | 4/2008 | Miller |
| 2008/0082308 A1 | 4/2008 | Kant et al. |
| 2008/0097637 A1 | 4/2008 | Nguyen et al. |
| 2008/0116051 A1 | 5/2008 | Miller et al. |
| 2008/0120060 A1 | 5/2008 | Kant et al. |
| 2008/0167839 A1 | 7/2008 | Miller |
| 2008/0177513 A1 | 7/2008 | Miller |
| 2008/0208527 A1 | 8/2008 | Kavaklioglu |
| 2009/0089009 A1 | 4/2009 | Miller |
| 2009/0097537 A1 | 4/2009 | Miller |

FOREIGN PATENT DOCUMENTS

| | | | |
|---|---|---|---|
| EP | 0 626 697 A1 | 11/1994 | |
| EP | 0 961 184 A2 | 12/1999 | |
| EP | 0 964 325 A1 | 12/1999 | |
| EP | 0 965 897 A1 | 12/1999 | |
| GB | 2 294 129 A | 4/1996 | |
| GB | 2 294 793 A | 5/1996 | |
| GB | 2 347 234 A | 8/2000 | |
| GB | 2 360 357 A | 9/2001 | |
| JP | 07-152714 | 6/1995 | |
| WO | WO-01/79948 A1 | 10/2001 | |
| WO | WO-2006/026340 | 3/2006 | |
| WO | WO-2006/107933 | 10/2006 | |

OTHER PUBLICATIONS

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE Predictor™ Services—Services Information," GE Industrial Systems, available at http://www.geindustrial.com/cwc/services?id=71 on Jul. 18, 2002.

"PREDICTOR™ Services," GE Industrial Systems, available at http://www.geindustrial.com/cwc/services?id=74 on Jul. 18, 2002.

"Root Cause Diagnostics: Software for Diagnosing Problems in Typical Industrial Loops," Kavaklioglu et al., presented at Maintenance and Reliability Conference (MARCON 2002), Knoxville, TN, May 2002.

"Root Cause Diagnostics™ SNAP-ON™ Application," Emerson Process Management, available at http://www.documentation.emersonprocess.com/gaps/public/documents/data_sheets/allds04ole_ROOTCx.pdf.

U.S. Appl. No. 11/492,467, "Method and System for Detecting Abnormal Operation in a Process Plant," filed Jul. 25, 2006.

Ashish Mehta, et al., "Feedforward Neural Networks for Process Identification and Prediction," presented at ISA 2001, Houston, Texas, Sep. 2001.

Chiang et al., "Fault Detection and Diagnosis in Industrial Systems," pp. 70-83, Springer-Verlag London Berlin Heidelberg (2001).

Vasiliki Tzovla, et al., "Abnormal Condition Management Using Expert Systems," presented at ISA 2001, Houston, Texas, Sep. 2001.

Wernwe Kalkhoff, "Agent-Oriented Robot Task Transformation", Proceedings of the International Symposium on Intelligent Control, IEEE, pp. 242-247 (Aug. 27, 1995).

International Preliminary Report on Patentability for Application No. PCT/US2007/074358, dated Jan. 27, 2009.

Du et al., "Automated Monitoring of Manufacturing Processes, Part 1: Monitoring Methods," J. Engineering for Industry, 117:121-132 (1995).

Final Office Action mailed Jan. 9, 2008 (U.S. Appl. No. 11/492,460).

Final Office Action mailed Jun. 11, 2008 (U.S. Appl. No. 11/492,460).

Final Office Action mailed Jun. 26, 2008 (U.S. Appl. No. 11/492,467).

Hines et al., "Sensor Validation and Instrument Calibration Monitoring," University of Tennesse Maintenance and Reliability Center (2001).

Horch, "Oscillation Diagnosis in Control Loops—Stiction and Other Causes," Proceedings of the 2006 American Control Conference, Minneapolis, Minnesota, pp. 2086-2096 (2006).

International Preliminary Report on Patentability and Written Opinion for Application No. PCT/US2007/074259, dated Feb. 5, 2009.

International Preliminary Report on Patentability and Written Opinion for Application No. PCT/US2007/074355, dated Feb. 5, 2009.

International Preliminary Report on Patentability and Written Opinion for Application No. PCT/US2007/074363, dated Feb. 5, 2009.

International Search Report for International Application No. PCT/US2007/074363, dated Dec. 20, 2007.

International Search Report for International Application No. PCT/US2007/074259, dated Dec. 7, 2007.

International Search Report for International Application No. PCT/US2007/074355, dated Dec. 20, 2007.

Montgomery, "Control Charts as a Tool in SQC (Statistical Quality Control)" Control Charts as a Tool in SQC, available at http://deming.eng.clemson.edu/pub/tutorials/qctools/ccmain-1.htm on May 30, 2006.

Non-Final Office Action mailed Feb. 3, 2009 (U.S. Appl. No. 11/492,347).

Non-Final Office Action mailed Jan. 17, 2007 (U.S. Appl. No. 11/492,460).

Non-Final Office Action mailed Nov. 13, 2008 (U.S. Appl. No. 11/492,460).

Non-Final Office Action mailed Nov. 26, 2008 (U.S. Appl. No. 11/492,467).

Non-Final Office Action mailed Oct. 9, 2007 (U.S. Appl. No. 11/492,467).

Pettersson, "Execution Monitoring in Robotics: A Survey," Robotics and Autonomous Systems, 53:73-88 (2005).

Romeu, "Understanding Binomial Sequential Testing," START: Selected Topics in Assurance Related Technologies, 12(2):1-8 (2005).

Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html> on May 31, 2006.

U.S. Appl. No. 11/492,577, "Method and System for Detecting Abnormal Operation of a Level Regulatory Control Loop," John P. Miller, filed Jul. 25, 2006.

Wald, "Sequential Tests of Statistical Hypotheses," Ann. Math. Statist., 16(2):117-186 (1945).

Written Opinion for International Application No. PCT/US2006/029986, dated Jun. 28, 2007.

Written Opinion for International Application No. PCT/US2007/074363, dated Dec. 20, 2007.

Written Opinion for International Application No. PCT/US2007/074355, dated Dec. 20, 2007.

Written Opinion for International Application No. PCT/US2007/074259, dated Dec. 7, 2007.

Non-Final Office Action mailed Apr. 27, 2009 (U.S. Appl. No. 11/492,460).

Final Office Action mailed May 28, 2009 (U.S. Appl. No. 11/492,467).

Advisory Action dated Apr. 1, 2011 (U.S. Appl. No. 11/619,846).

Final Office Action dated Aug. 23, 2011 (U.S. Appl. No. 11/492,460).

Final Office Action dated Dec. 9, 2010 (U.S. Appl. No. 11/492,460).

Final Office Action dated Dec. 17, 2010 (U.S. Appl. No. 11/619,846).

Final Office Action dated Jun. 1, 2010 (U.S. Appl. No. 11/619,830).

Final Office Action dated May 24, 2010 (U.S. Appl. No. 11/492,467).

Final Office Action dated Nov. 10, 2009 (U.S. Appl. No. 11/492,460).

Final Office Action dated Sep. 9, 2010 (U.S. Appl. No. 11/619,830).

International Preliminary Report on Patentability for International Application No. PCT/US2007/088593, dated Jul. 7, 2009.

International Preliminary Report on Patentability for International Application No. PCT/US2007/088579, dated Jul. 7, 2009.

International Search Report for International Application No. PCT/US2007/088593, dated Jun. 16, 2008.

International Search Report for International Application No. PCT/US2007/088579, dated May 26, 2008.

Non-Final Office Action dated Apr. 27, 2010 (U.S. Appl. No. 11/492,460).

Non-Final Office Action dated Jun. 3, 2010 (U.S. Appl. No. 11/619,846).

Non-Final Office Action dated Nov. 10, 2009 (U.S. Appl. No. 11/619,846).

Non-Final Office Action dated Oct. 27, 2009 (U.S. Appl. No. 11/492,467).

Non-Final Office Action dated Oct. 27, 2009 (U.S. Appl. No. 11/619,830).

* cited by examiner

METHOD AND SYSTEM FOR DETECTING ABNORMAL OPERATION OF A LEVEL REGULATORY CONTROL LOOP

CROSS-REFERENCES TO RELATED APPLICATIONS

This application is related to the following commonly-owned, co-pending patent application: U.S. patent application Ser. No. 11/492,467, entitled "METHOD AND SYSTEM FOR DETECTING ABNORMAL OPERATION IN A PROCESS PLANT," filed on the same day as the present application. The above-referenced patent application is hereby incorporated by reference herein, in its entirety.

TECHNICAL FIELD

This disclosure relates generally to process control systems and, more particularly, to systems for monitoring and/or modeling level regulatory control loops.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamps) signals to and from the process controller via an analog bus or analog lines. These 4 to 20 mA signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the AMS™ Suite: Intelligent Device Manager application (at least partially disclosed in U.S. Pat. No. 5,960,214 entitled "Integrated Communication. Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic arid optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms such as principal component analysis (PCA) and projections to latent structures (PLS) which analyze historical data to create a statistical model of the process. In-particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

With model-based performance monitoring system techniques, a model is utilized, such as a correlation-based model or a first-principles model, that relates process inputs to process outputs. The model may be calibrated to the actual plant operation by adjusting internal tuning constants or bias terms. The model can be used to predict when the process is moving into an abnormal region and alert the operator to take action. An alarm may be generated when there is a significant deviation in actual versus predicted behavior or when there is a big change in a calculated efficiency parameter. Model-based performance monitoring systems typically cover as small as a single unit operation (e.g. a pump, a compressor, a heater, a column, etc.) or a combination of operations that make up a process unit (e.g. crude unit, fluid catalytic cracking unit (FCCU), reformer, etc.)

SUMMARY OF THE DISCLOSURE

Example methods and systems are disclosed that may facilitate detecting an abnormal operation associated with a level regulatory control loop in a process plant. Generally speaking, a model for modeling at least a portion of the level regulatory control loop may be utilized with respect to first and second signals associated with regulatory control of a level of material in a tank. More specifically, the model may generate a prediction of the second signal as a function of first signal. The model may include a first regression model in a first range corresponding to a first operating region of the level regulatory control loop, and the model may be capable of being subsequently configured to include at least a second regression model in at least a second respective range corresponding to at least a second respective operating region different than the first operating region. It may be determined whether the second signal significantly deviates from the prediction of the second signal generated by the model. If there is a significant deviation, this may indicate an abnormal operation associated with the level regulatory control loop.

DETAILED DESCRIPTION

Figure 1:
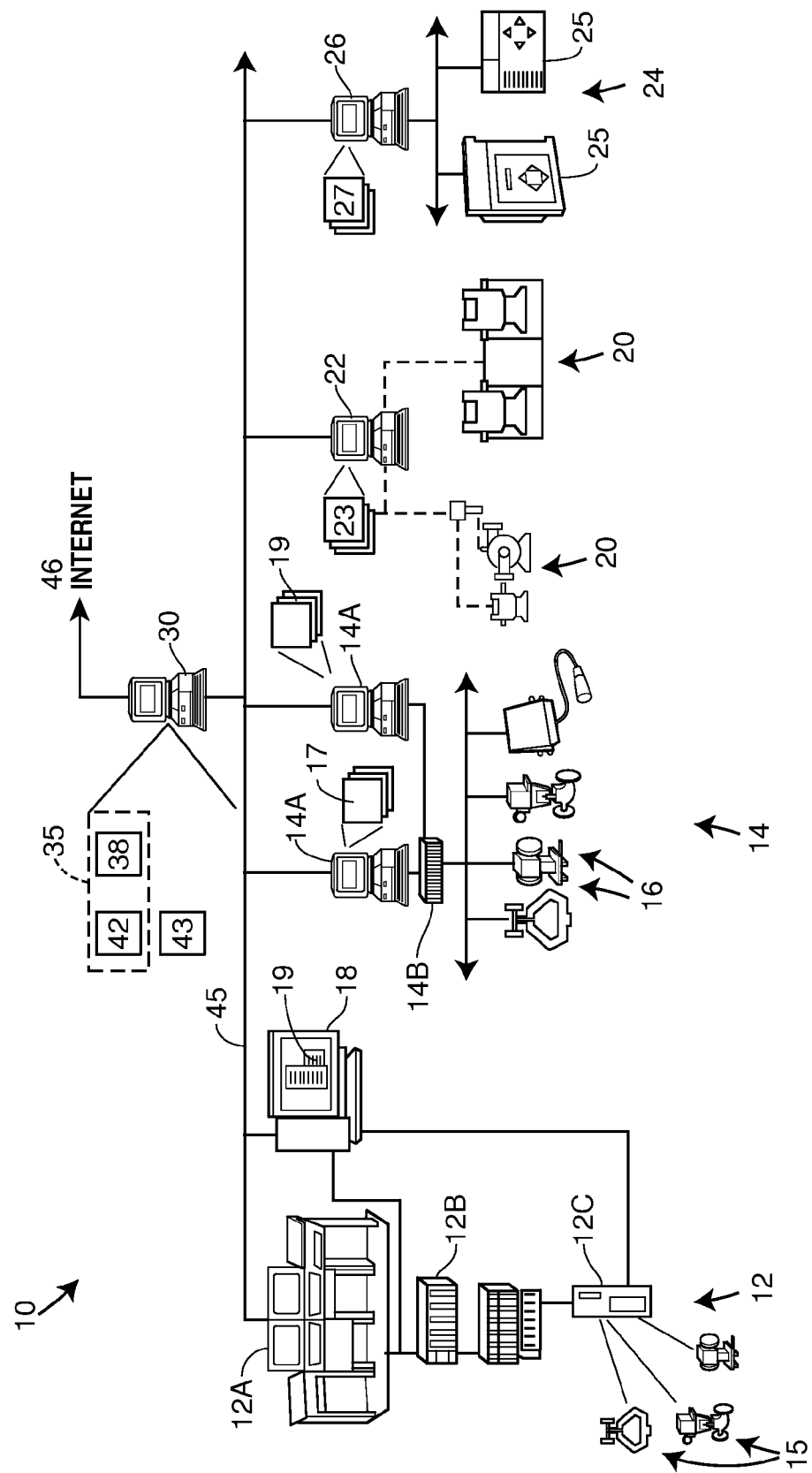
FIG. 1 is an exemplary block diagram of a process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on hand-held devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant I 0 are described herein, one of ordinary skill in the art will recognize, that a variety of other methods of coupling the abnormal situation prevention system 35 to computers/devices in the plant 10 can be used as well.

Figure 2:
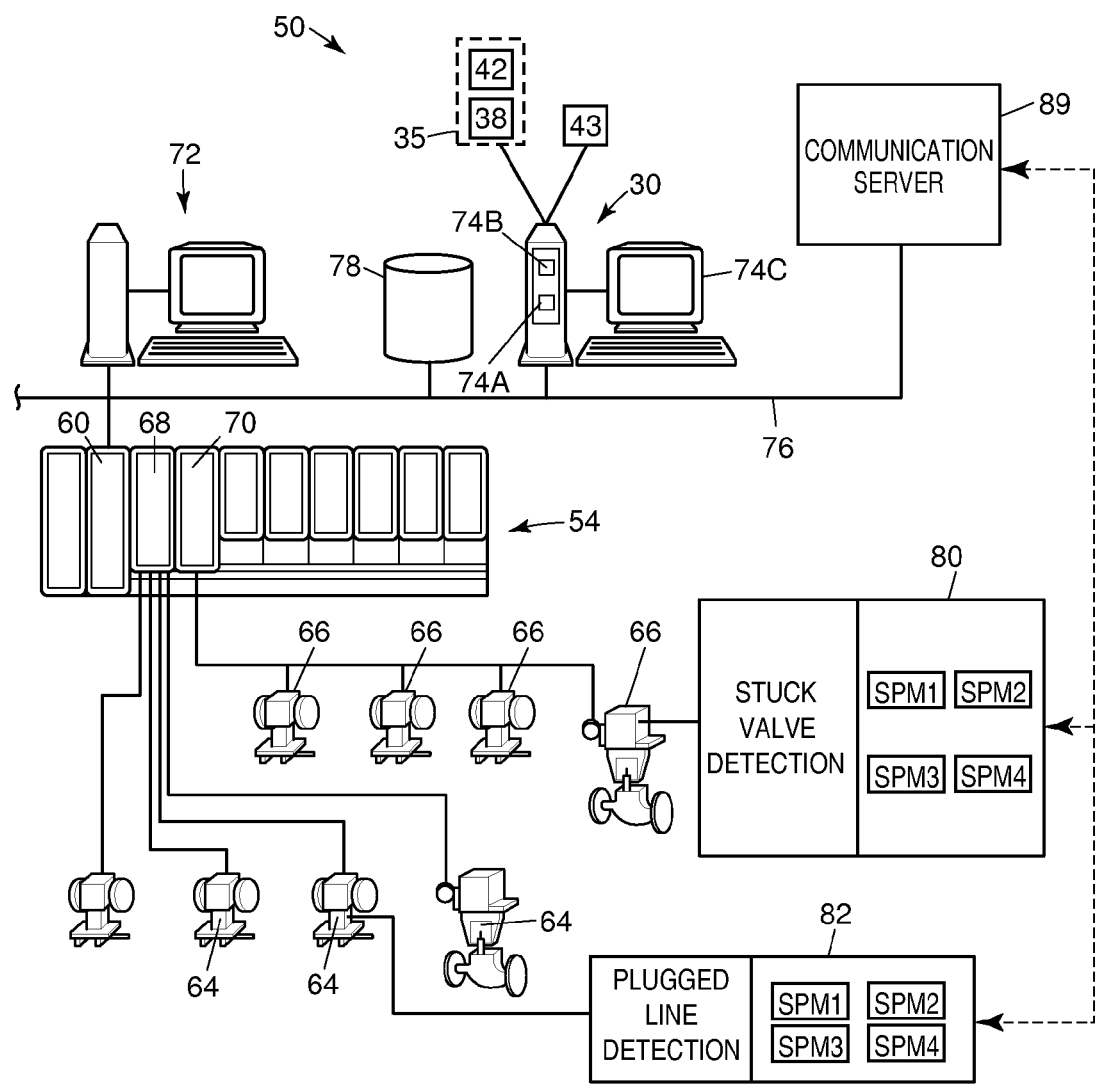
FIG. 2 is an exemplary block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART and Fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the data base 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, nor the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known-Foundation Fieldbus SPM blocks, or SPM blocks that have different or additional capabilities as compared with known Foundation Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of blocks 50 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM block located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may includes one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Overview of an Abnormal Operation Detection (AOD) System

Figure 3:
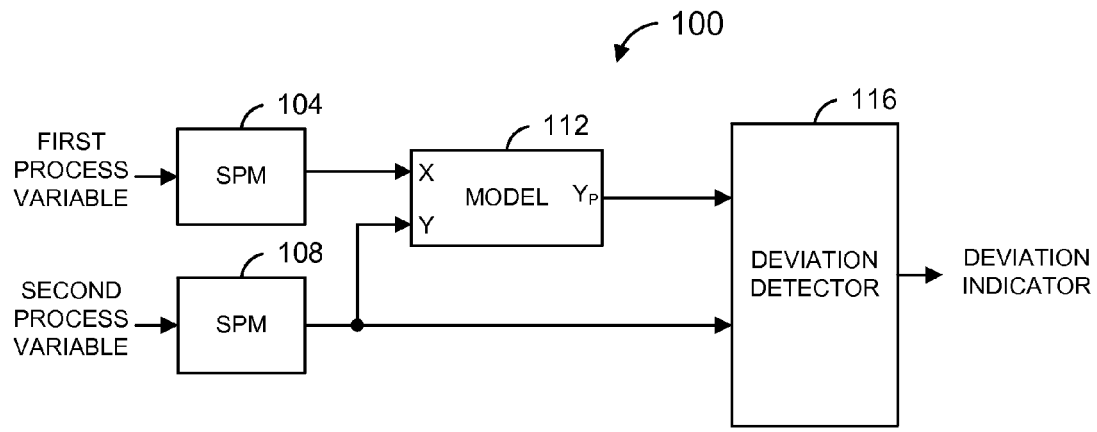
FIG. 3 is an example abnormal operation detection (AOD) system that utilizes one or more regression models.

FIG. 3 is a block diagram of an example abnormal operation detection (AOD) system 100 that could be utilized in the abnormal operation detection blocks 80 and 82 of FIG. 2. The AOD system 100 includes a first SPM block 104 and a second SPM block 108 coupled to a model 112. The first SPM block 104 receives a first process variable and generates first statistical data from the first process variable. The first statistical data could be any of various kinds of statistical data such as mean data, median data, standard deviation data, rate of change data, range data, etc., calculated from the first process variable. Such data could be calculated based on a sliding window of first process variable data or based on non-overlapping windows of first process variable data. As one example, the first SPM block 104 may generate mean data using a most recent first process variable sample and 49 previous samples of the first process variable. In this example, a mean variable value may be generated for each new first process variable sample received by the first SPM block 104. As another example, the first SPM block 104 may generate mean data using non-overlapping time periods. In this example, a window of five minutes (or some other suitable time period) could be used, and a mean variable value would thus be generated every five minutes. In a similar manner, the second SPM block 108 receives a second process variable and generates second statistical data from the second process variable in a manner similar to the SPM block 104.

The model 112 includes an independent variable X input and a dependent variable Y. As will be described in more detail below, the model 112 may be trained using a plurality of data sets (X, Y), to model Y (dependent variable) as a function of X (independent variable). As will be described in more detail below, the model 112 may include one or more regression models, each regression model for a different operating region. Each regression model may utilize a function to model the dependent variable Y as a function of the independent variable X over some range of X. The regression model may comprise be a linear regression model, for example, or some other regression model. Generally, a linear regression model comprises some linear combination of functions $f(X)$, $g(X)$, $h(X)$, ... For modeling an industrial process, a typically adequate linear regression model may comprise a first order function of X (e.g., $Y=m*X+b$) or a second order function of X (e.g., $Y=a*X^2+b*X+c$). Of course, other types of functions may be utilized as well such as higher order polynomials, sinusoidal functions, logarithmic functions, exponential functions, power functions, etc.

After it has been trained, the model 112 may be used to generate a predicted value ($Y_P$) of a dependent variable Y based on a given independent variable X input. The output $Y_P$ of the model 112 is provided to a deviation detector 116. The deviation detector 116 receives the output $Y_P$ of the regression model 112 as well as the dependent variable input Y to the model 112. Generally speaking, the deviation detector 116 compares the dependent variable Y to the value $Y_P$ generated by the model 112 to determine if the dependent variable Y is significantly deviating from the predicted value $Y_P$. If the dependent variable Y is significantly deviating from the predicted value $Y_P$, this may indicate that an abnormal situation has occurred, is occurring, or may occur in the near future, and thus the deviation detector 116 may generate an indicator of the deviation. In some implementations, the indicator may comprise an alert or alarm.

One of ordinary skill in the art will recognize that the AOD system 100 can be modified in various ways. For example, the SPM blocks 104 and 108 could be omitted. As another example, other types of processing in addition to or instead of the SPM blocks 104 and 108 could be utilized. For example, the process variable data could be filtered, trimmed, etc., prior to the SPM blocks 104 and 108, or rather than utilizing the SPM blocks 104 and 108.

Additionally, although the model 112 is illustrated as having a single independent variable input X, a single dependent variable input Y, and a single predicted value $Y_P$, the model 112 could include a regression model that models multiple variables Y as a function of multiple variables X. For example, the model 112 could comprise a multiple linear regression (MLR) model, a principal component regression (PCR) model, a partial least squares (PLS) model, a ridge regression (RR) model, a variable subset selection (VSS) model, a support vector machine (SVM) model, etc.

The AOD system 100 could be implemented wholly or partially in a field device. As just one example, the SPM blocks 104 and 108 could be implemented in a field device 66 and the model 112 and/or the deviation detector 116 could be implemented in the controller 60 or some other device. In one particular implementation, the AOD system 100 could be implemented as a function block, such as a function block to be used in system that implements a Fieldbus protocol. Such a function block may or may not include the SPM blocks 104 and 108. In another implementation, each of at least some of the blocks 104, 108, 112, and 116 may be implemented as a function block.

The AOD system 100 may be in communication with the abnormal situation prevention system 35 (FIGS. 1 and 2). For example, the AOD system 100 may be in communication with the configuration application 38 to permit a user to configure the AOD system 100. For instance, one or more of the SPM blocks 104 and 108, the model 112, and the deviation detector 116 may have user configurable parameters that may be modified via the configuration application 38.

Additionally, the AOD system 100 may provide information to the abnormal situation prevention system 35 and/or other systems in the process plant. For example, the deviation indicator generated by the deviation detector 116 could be provided to the abnormal situation prevention system 35 and/or the alert/alarm application 43 to notify an operator of the abnormal condition. As another example, after the model 112 has been trained, parameters of the model could be provided to the abnormal situation prevention system 35 and/or other systems in the process plant so that an operator can examine the model and/or so that the model parameters can be stored in a database. As yet another example, the AOD system 100 may provide X, Y, and/or $Y_P$ values to the abnormal situation prevention system 35 so that an operator can view the values, for instance, when a deviation has been detected.

Figure 4:
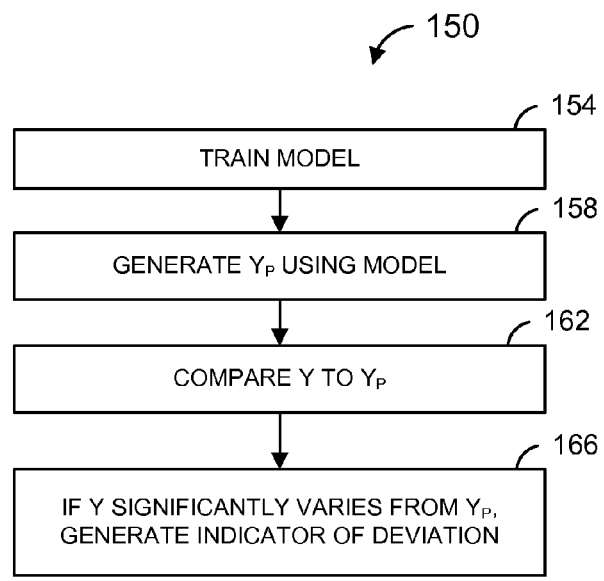
FIG. 4 is flow diagram of an example method that may be implemented using the example AOD system of FIG. 3.

FIG. 4 is a flow diagram of an example method 150 for detecting an abnormal operation in a process plant. The method 150 could be implemented using the example AOD system 100 of FIG. 3 and will be used to explain the operation of the AOD system 100. However, one of ordinary skill in the art will recognize that the method 150 could be implemented by a system different than the AOD system 100. At a block 154, a model, such as the model 112, is trained. For example, the model could be trained using independent variable X and dependent variable Y data sets to configure it to model Y as a function of X. The model could include multiple regression models that each model Y as a function of X for a different range of X.

Then, at a block 158, the trained model generates predicted values ($Y_P$) of the dependent variable Y using values of the independent variable X that it receives. Next, at a block 162, the actual values of Y are compared to the corresponding predicted values $Y_P$ to determine if Y is significantly deviating from $Y_P$. For example, the deviation detector 116 receives the output $Y_P$ of the model 112 and compares it to the dependent variable Y. If it is determined that Y has significantly deviated from $Y_P$ an indicator of the deviation may be generated at a block 166. In the AOD system 100, for example, the deviation detector 116 may generate the indicator. The indicator may be an alert or alarm, for example, or any other type of signal, flag, message, etc., indicating that a significant deviation has been detected.

As will be discussed in more detail below, the block 154 may be repeated after the model has been initially trained and after it has generated predicted values $Y_P$ of the dependent variable Y. For example, the model could be retrained if a set point in the process has been changed.

Overview of the Model

Figure 5:
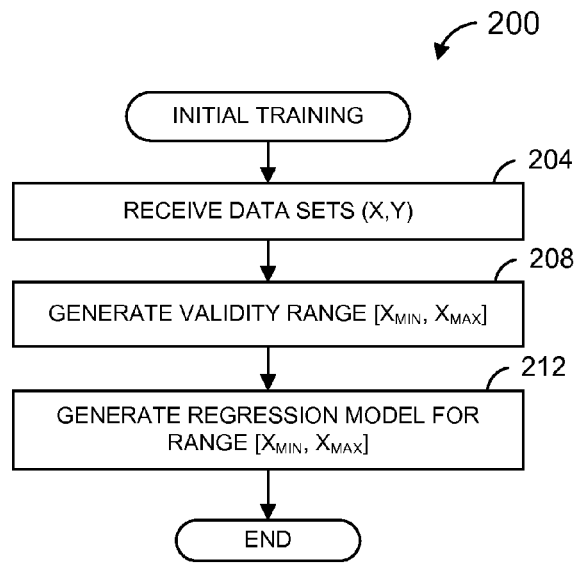
FIG. 5 is a flow diagram of an example method for initially training the model of FIG. 3.
Figure 6A:
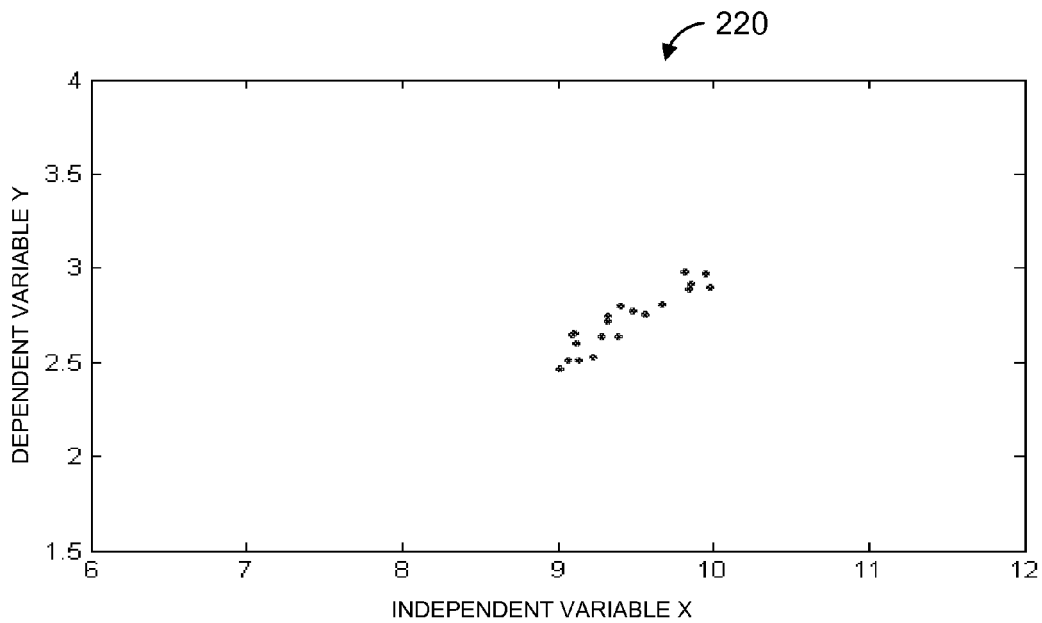
FIG. 6A is a graph showing a plurality of data sets that may be used by the model of FIG. 3 to develop a regression model.

FIG. 5 is a flow diagram of an example method 200 for initially training a model such as the model 112 of FIG. 3. At a block 204, at least an adequate number of data sets (X, Y) for the independent variable X and the dependent variable Y may be received in order to train a model. As described above, the data sets (X, Y) may comprise process variable data, process variable data that has been filtered or otherwise processed, statistical data generated from the process variable data, etc. In the AOD system of FIG. 3, the model 112 may receive data sets (X, Y) from the SPM blocks 104 and 108. Referring now to FIG. 6A, a graph 220 shows an example of a plurality of data sets (X,Y) received by a model.

Referring again to FIG. 5, at a block 208, a validity range $[X_{MIN}, X_{MAX}]$ for the model may be generated. The validity range may indicate a range of the independent variable X for which the model is valid. For instance, the validity range may indicate that the model is valid only for X values in which X is greater than or equal to $X_{MIN}$ and less than or equal to $X_{MAX}$. As just one example, $X_{MIN}$ could be set as the smallest value of X in the data sets (X,Y) received at the block 204, and $X_{MAX}$ could be set as the largest value of X in the data sets (X,Y) received at the block 204. Referring again to FIG. 6A, $X_{MIN}$ could be set to the X value of the leftmost data set, and $X_{MAX}$ could be set as the X value of the rightmost data set, for example. Of course, the determination of validity range could be implemented in other ways as well. In the AOD system 100 of FIG. 3, the model block 112 could generate the validity range.

Figure 6B:
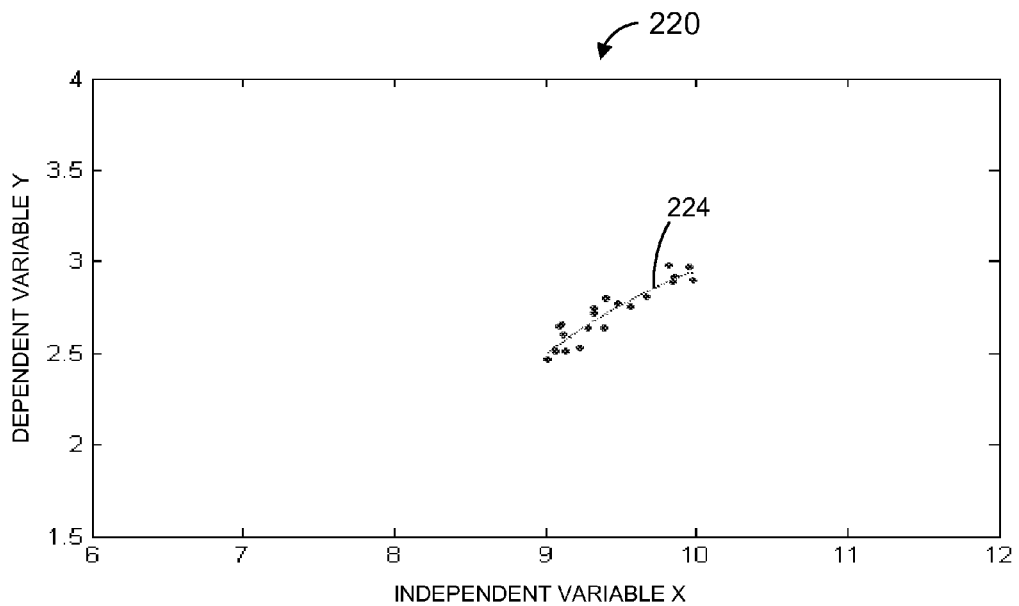
FIG. 6B is a graph showing a regression model developed using the plurality of data sets of FIG. 6A.
Figure 6C:
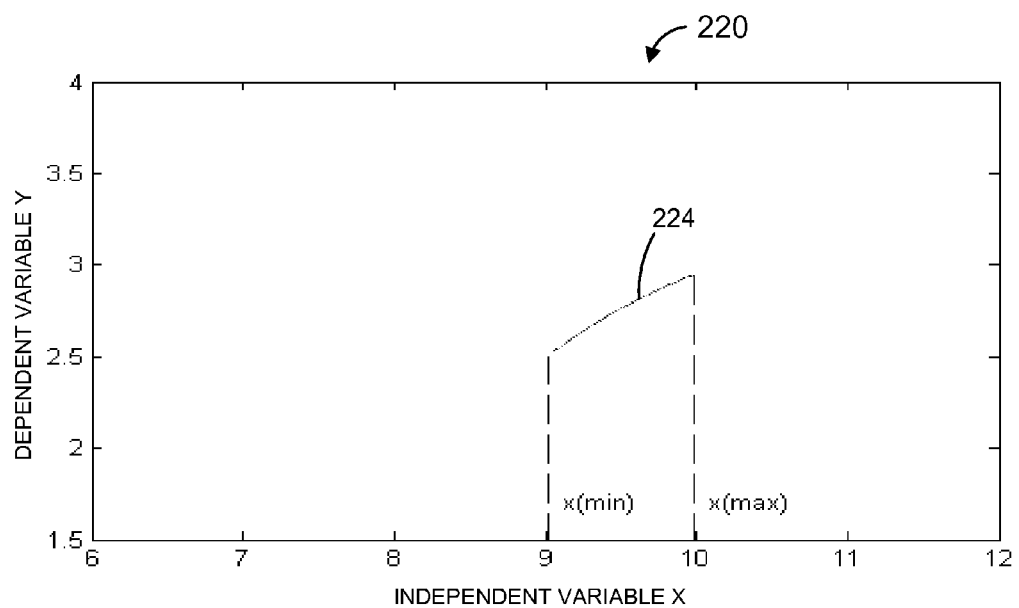
FIG. 6C is graph showing the regression model of FIG. 6B and its range of validity.

At a block 212, a regression model for the range $[X_{MIN}, X_{MAX}]$ may be generated based on the data sets (X, Y) received at the block 204. Any of a variety of techniques, including known techniques, may be used to generate the regression model, and any of a variety of functions could be used as the model. For example, the model of could comprise a linear equation, a quadratic equation, a higher order equation, etc. In FIG. 6B, a curve 224 superimposed on the data sets (X, Y) received at the block 204 illustrates a regression model that has been generated to model the data sets (X, Y). In FIG. 6C, the curve 224 is illustrated without the data sets (X, Y). The regression model corresponding to the curve 224 is valid in the range $[X_{MIN}, X_{MAX}]$. In the AOD system 100 of FIG. 3, the model block 112 could generate the regression model for the range $[X_{MIN}, X_{MAX}]$.

Utilizing the Model through Operating Region Changes

Figure 7:
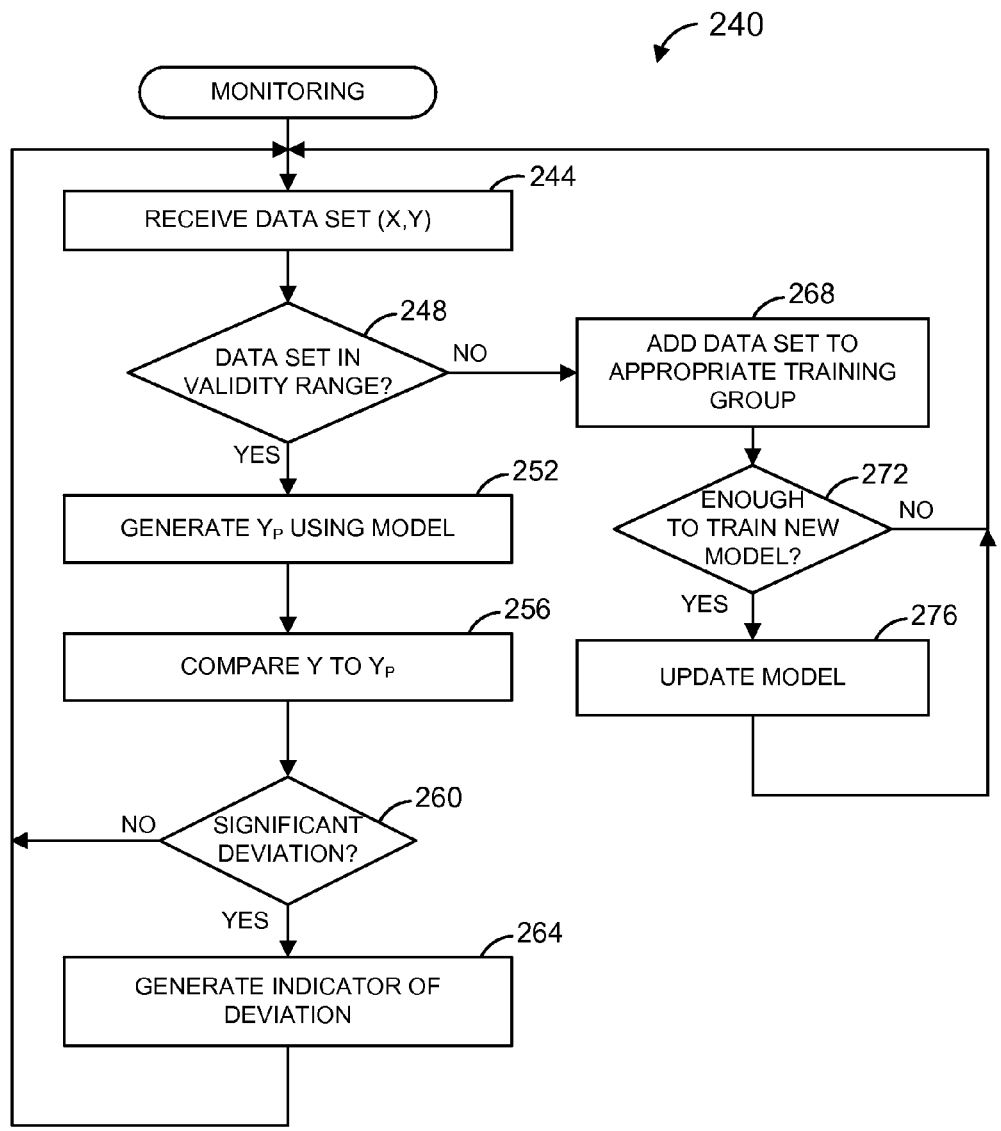
FIG. 7 is flow diagram of an example method that may be implemented using the example abnormal operation detection system of FIG. 3.

It may be that, after the model has been initially trained, the system that it models may move into a different, but normal operating region. For example, a set point may be changed. FIG. 7 is a flow diagram of an example method 240 for using a model to determine whether abnormal operation is occurring, has occurred, or may occur, wherein the model may be updated if the modeled process moves into a different operating region. The method 240 may be implemented by an AOD system such as the AOD system 100 of FIG. 3. Of course, the method 240 could be implemented by other types of AOD systems as well. The method 240 may be implemented after an initial model has been generated. The method 200 of FIG. 5, for example, could be used to generate the initial model.

At a block 244, a data set (X, Y) is received. In the AOD system 100 of FIG. 3, the model 112 could receive a data set (X,Y) from the SPM blocks 104 and 108, for example. Then, at a block 248, it may be determined whether the data set (X, Y) received at the block 244 is in a validity range. The validity range may indicate a range in which the model is valid. In the AOD system 100 of FIG. 3, the model 112 could examine the value X received at the block 244 to determine if it is within the validity range $[X_{MIN}, X_{MAX}]$. If it is determined that the data set (X, Y) received at the block 244 is in the validity range, the flow may proceed to a block 252.

At the block 252, a predicted value $Y_P$ of the dependent variable Y may be generated using the model. In particular, the model generates the predicted value $Y_P$ from the value X received at the block 244. In the AOD system 100 of FIG. 3, the model 112 generates the predicted value $Y_P$ from the value X received from the SPM block 104.

Figure 8A:
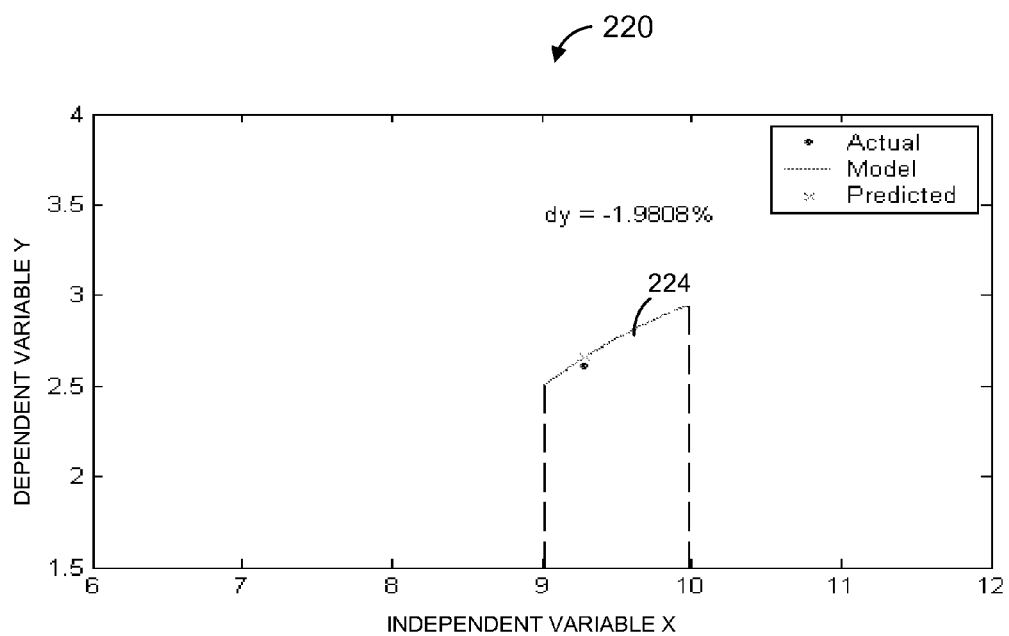
FIG. 8A is a graph showing a received data set and a corresponding predicted value generated by the model of FIG. 3.
Figure 8B:
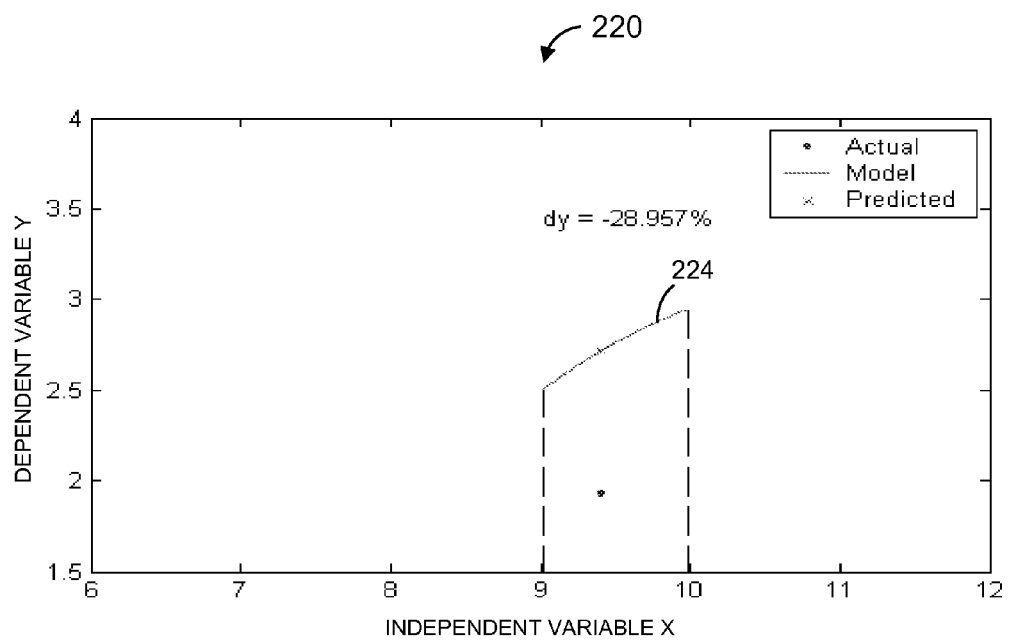
FIG. 8B is a graph showing another received data set and another corresponding predicted value generated by the model of FIG. 3.

Then, at a block 256, the value Y received at the block 244 may be compared with the predicted value $Y_P$. The comparison may be implemented in a variety of ways. For example, a difference or a percentage difference could be generated. Other types of comparisons could be used as well. Referring now to FIG. 8A, an example received data set is illustrated in the graph 220 as a dot, and the corresponding predicted value, $Y_P$, is illustrated as an "x". As illustrated in FIG. 8A, it has been calculated that the difference between Y received at the block 244 and the predicted value $Y_P$ is –1.9808%. Referring now to FIG. 8B, another example received data set is illustrated in the graph 220 as a dot, and the corresponding predicted value, $Y_P$, is illustrated as an "x". As illustrated in FIG. 8B, it has been calculated that the difference between Y received at the block 244 and the predicted value $Y_P$ is –28.957%. In the AOD system 100 of FIG. 3, the deviation detector 116 may perform the comparison.

Referring again to FIG. 7, at a block 260, it may be determined whether the value Y received at the block 244 significantly deviates from the predicted value $Y_P$ based on the comparison of the block 256. The determination at the block 260 may be implemented in a variety of ways and may depend upon how the comparison of the block 256 was implemented. For example, if a difference value was generated at the block 256, it may be determined whether this difference value exceeds some threshold. The threshold may be a predetermined or configurable value. Also, the threshold may be constant or may vary. For example, the threshold may vary depending upon the value of the independent variable X value received at the block 244. As another example, if a percentage difference value was generated at the block 256, it may be determined whether this percentage value exceeds some threshold percentage. As yet another example, a significant deviation may be determined only if two or some other number of consecutive comparisons exceed a threshold. Referring again to FIG. 8A, the difference between Y received at the block 244 and the predicted value $Y_P$ is –1.9808%. If, for example, a threshold of 10% is to be used to determine whether a deviation is significant, the absolute value of the difference illustrated in FIG. 8A is below that threshold. Referring again to FIG. 8B on the other hand, the difference between Y received at the block 244 and the predicted value $Y_P$ is –28.957%. The absolute value of the difference illustrated in FIG. 8B is above the threshold value 10% so an abnormal condition indicator may be generated as will be discussed below. In the AOD system 100 of FIG. 3, the deviation detector 116 may implement the block 260.

In general, determining if the value Y significantly deviates from the predicted value $Y_P$ may be implemented using a variety of techniques, including known techniques. For instance, determining if the value Y significantly deviates from the predicted value $Y_P$ may include analyzing the present values of Y and $Y_P$. For example, Y could be subtracted from $Y_P$, or vice versa, and the result may be compared to a threshold to see if it exceeds the threshold. It may optionally comprise also analyzing past values of Y and $Y_P$. Further, it may comprise comparing Y or a difference between Y and $Y_P$ to one or more thresholds. Each of the one or more thresholds may be fixed or may change. For example, a threshold may change depending on the value of X or some other variable. U.S. patent application Ser. No. 11/492,347, entitled "METHODS AND SYSTEMS FOR DETECTING DEVIATION OF A PROCESS VARIABLE FROM EXPECTED VALUES," filed on the same day as the present application, and which is hereby incorporated by reference herein, describes example systems and methods for detecting whether a process variable significantly deviates from an expected value, and any of these systems and methods may optionally be utilized. One of ordinary skill in the art will recognize many other ways of determining if the value Y significantly deviates from the predicted value $Y_P$. Further, blocks 256 and 260 may be combined.

Some or all of criteria to be used in the comparing Y to $Y_P$ (block 256) and/or the criteria to be used in determining if Y significantly deviates from $Y_P$ (block 260) may be configurable by a user via the configuration application 38 (FIGS. 1 and 2) for example. For instance, the type of comparison (e.g., generate difference, generate absolute value of difference, generate percentage difference, etc.) may be configurable. Also, the threshold or thresholds to be used in determining whether the deviation is significant may be configurable. Alternatively, such criteria may not be readily configurable by an operator.

Referring again to FIG. 7, if it is determined that the value Y received at the block 244 does not significantly deviate from the predicted value $Y_P$, the flow may return to the block 244 to receive the next data set (X,Y). If however, it is determined that the value Y does significantly deviate from the predicted value $Y_P$, the flow may proceed to the block 264. At the block 264, an indicator of a deviation may be generated. The indicator may be an alert or alarm, for example. The generated indicator may include additional information such as whether the value Y received at the block 244 was higher than expected or lower than expected, for example. Referring to FIG. 8A, because the difference between Y received at the block 244 and the predicted value $Y_P$ is −1.9808%, which is below the threshold 10%, no indicator is generated. On the other hand, referring to FIG. 8B, the difference between Y received at the block 244 and the predicted value $Y_P$ is −28.957%, which is above the threshold 10%. Therefore, an indicator is generated. In the AOD system 100 of FIG. 3, the deviation detector 116 may generate the indicator.

Figure 9A:
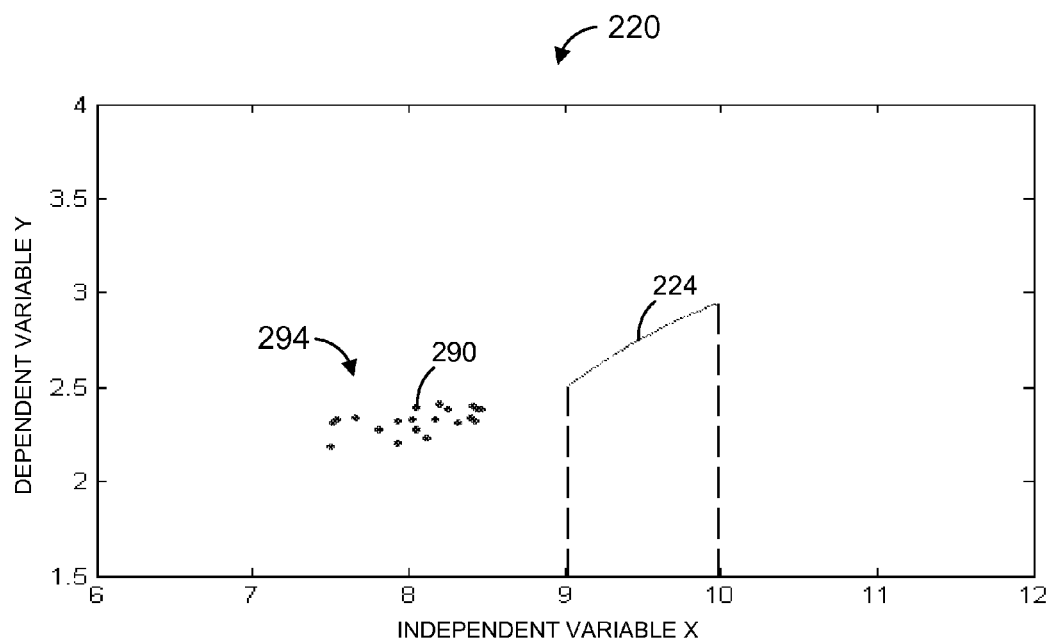
FIG. 9A is a graph showing a plurality of data sets that may be used by the model of FIG. 3 to develop a second regression model in a different operating region.

Referring again to the block 248 of FIG. 7, if it is determined that the data set (X, Y) received at the block 244 is not in the validity range, the flow may proceed to a block 268. Referring now to FIG. 9A, it shows a graph illustrating a received data set 290 that is not in the validity range. Referring again to FIG. 7, at the block 268, the data set (X, Y) received at the block 244 may be added to an appropriate group of data sets that may be used to train the model at a subsequent time. For example, if the value of X received at the block 244 is less than $X_{MIN}$, the data set (X,Y) received at the block 244 may be added to a data group corresponding to other received data sets in which the value of X is less than $X_{MIN}$. Similarly, if the value of X received at the block 244 is greater than $X_{MAX}$, the data set (X,Y) received at the block 244 may be added to a data group corresponding to other received data sets in which the value of X is greater than $X_{MAX}$. Referring to FIG. 9A, the data set 290 has been added to a group of data sets 294 corresponding to data sets in which the value of X is less than $X_{MIN}$. In the AOD system 100 of FIG. 3, the model block 112 may implement the block 268.

Then, at a block 272, it may be determined if enough data sets are in the data group to which the data set was added at the block 268 in order to generate a regression model corresponding to the data in that group. This determination may be implemented using a variety of techniques. For example, the number of data sets in the group may be compared to a minimum number, and if the number of data sets in the group is at least this minimum number, it may be determined that there are enough data sets in order to generate a regression model. The minimum number may be selected using a variety of techniques, including techniques known to those of ordinary skill in the art. If it is determined that there are enough data sets in order to generate a regression model, the model may be updated at a block 276, as will be described below with reference to FIG. 10. If it is determined, however, that there are not enough data sets in order to generate a regression model, the flow may return to the block 244 to receive the next data set (X, Y).

Figure 10:
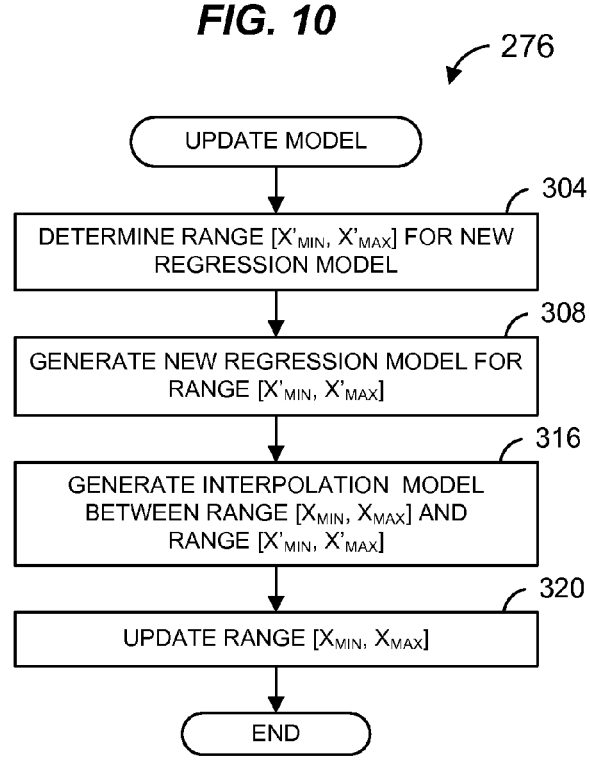
FIG. 10 is a flow diagram of an example method for updating the model of FIG. 3.

FIG. 10 is a flow diagram of an example method 276 for updating the model after it is determined that there are enough data sets in a group in order to generate a regression model for data sets outside the current validity range $[X_{MIN}, X_{MAX}]$. At a block 304, a range $[X'_{MIN}, X'_{MAX}]$ for a new regression model may be determined. The validity range may indicate a range of the independent variable X for which the new regression model will be valid. For instance, the validity range may indicate that the model is valid only for X values in which X is greater than or equal to $X'_{MIN}$ and less than or equal to $X'_{MAX}$. As just one example, $X'_{MIN}$ could be set as the smallest value of X in the group of data sets (X,Y), and $X'_{MAX}$ could be set as the largest value of X in the group of data sets (X,Y). Referring again to FIG. 9A, $X'_{MIN}$ could be set to the X value of the leftmost data set in the group 294, and $X'_{MAX}$ could be set as the X value of the rightmost data set in the group 294, for example. In the AOD system 100 of FIG. 3, the model block 112 could generate the validity range.

Figure 9B:
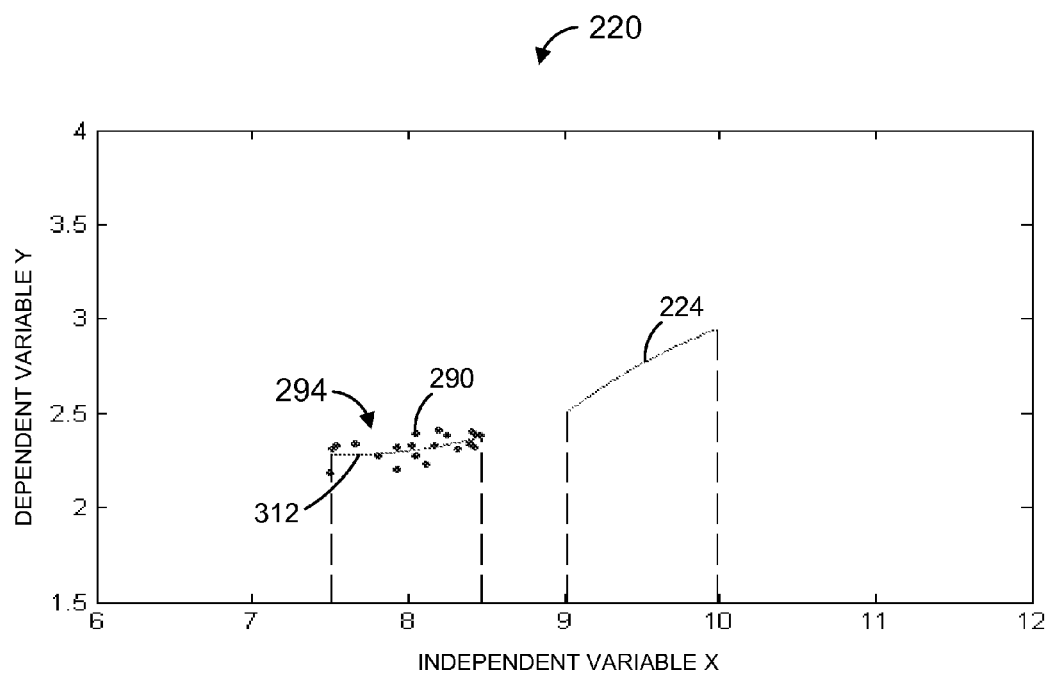
FIG. 9B is a graph showing a second regression model developed using the plurality of data sets of FIG. 9A.

At a block 308, a regression model for the range $[X'_{MIN}, X'_{MAX}]$ may be generated based on the data sets (X, Y) in the group. Any of a variety of techniques, including known techniques, may be used to generate the regression model, and any of a variety of functions could be used as the model. For example, the model could comprise a linear equation, a quadratic equation, etc. In FIG. 9B, a curve 312 superimposed on the group 294 illustrates a regression model that has been generated to model the data sets in the group 294. The regression model corresponding to the curve 312 is valid in the range $[X'_{MIN}, X'_{MAX}]$, and the regression model corresponding to the curve 224 is valid in the range $[X_{MIN}, X_{MAX}]$. In the AOD system 100 of FIG. 3, the model 112 could generate the regression model for the range $[X'_{MIN}, X'_{MAX}]$.

For ease of explanation, the range $[X_{MIN}, X_{MAX}]$ will now be referred to as $[X_{MIN\_1}, X_{MAX\_1}]$, and the range $[X'_{MIN}, X'_{MAX}]$ will now be referred to as $[X_{MIN\_2}, X_{MAX\_2}]$. Additionally, the regression model corresponding to the range $[X_{MIN\_1}, X_{MAX\_1}]$ will be referred to as $f_1(x)$, and regression model corresponding to the range $[X_{MIN\_2}, X_{MAX\_2}]$ will be referred to as $f_2(x)$. Thus, the model may now be represented as:

$$f(X) = \begin{cases} f_1(X) & \text{for } X_{MIN\_1} \leq X \leq X_{MAX\_1} \\ f_2(X) & \text{for } X_{MIN\_2} \leq X \leq X_{MAX\_2} \end{cases} \quad \text{(Equ. 1)}$$

Referring again to FIG. 10, at a block 316, an interpolation model may be generated between the regression models corresponding to the ranges $[X_{MIN\_1}, X_{MAX\_1}]$ and $[X_{MIN\_2}, X_{MAX\_2}]$. The interpolation model described below comprises a linear function, but in other implementations, other types of functions, such as a quadratic function, can be used. If $X_{MAX\_1}$ is less than $X_{MIN\_2}$, then the interpolation model may be calculated as:

$$\left(\frac{f_2(X_{MIN\_2}) - f_1(X_{MAX\_1})}{X_{MIN\_2} - X_{MAX\_1}}\right)(X - X_{MIN\_2}) + f_2(X_{MIN\_2}) \quad \text{(Equ. 2)}$$

Similarly, if $X_{MAX\_2}$ is less than $X_{MIN\_1}$, then the interpolation model may be calculated as:

$$\left(\frac{f_1(X_{MIN\_1}) - f_2(X_{MAX\_2})}{X_{MIN\_1} - X_{MAX\_2}}\right)(X - X_{MIN\_1}) + f_1(X_{MIN\_1}) \quad \text{(Equ. 3)}$$

Thus, the model may now be represented as:

$$f(X) = \begin{cases} f_1(X) & \text{for } X_{MIN\_1} \leq X \leq X_{MAX\_1} \\ \left(\frac{f_2(X_{MIN\_2}) - f_1(X_{MAX\_1})}{X_{MIN\_2} - X_{MAX\_1}}\right) \\ (X - X_{MIN\_1}) + f_1(X_{MIN\_1}) & \text{for } X_{MAX\_1} < X < X_{MIN\_2} \\ f_2(X) & \text{for } X_{MIN\_2} \leq X \leq X_{MAX\_2} \end{cases} \quad \text{(Equ. 4)}$$

if $X_{MAX\_1}$ is less than $X_{MIN\_2}$. And, if $X_{MAX\_2}$ is less than $X_{MIN\_1}$, the interpolation model may be represented as:

$$f(X) = \begin{cases} f_2(X) & \text{for } X_{MIN\_2} \leq X \leq X_{MAX\_2} \\ \left(\frac{f_1(X_{MIN\_1}) - f_2(X_{MAX\_2})}{X_{MIN\_1} - X_{MAX\_2}}\right) \\ (X - X_{MIN\_1}) + f_1(X_{MIN\_1}) & \text{for } X_{MAX\_2} < X < X_{MIN\_1} \\ f_1(X) & \text{for } X_{MIN\_1} \leq X \leq X_{MAX\_1} \end{cases} \quad \text{(Equ. 5)}$$

As can be seen from equations 1, 4 and 5, the model may comprise a plurality of regression models. In particular, a first regression model (i.e., $f_1(X)$) may be used to model the dependent variable Y in a first operating region (i.e., $X_{MIN\_1} \leq X \leq X_{MAX\_1}$), and a second regression model (i.e., $f_2(X)$) may be used to model the dependent variable Y in a second operating region (i.e., $X_{MIN\_2} \leq X \leq X_{MAX\_2}$). Additionally, as can be seen from equations 4 and 5, the model may also comprise an interpolation model to model the dependent variable Y in between operating regions corresponding to the regression models.

Figure 9C:
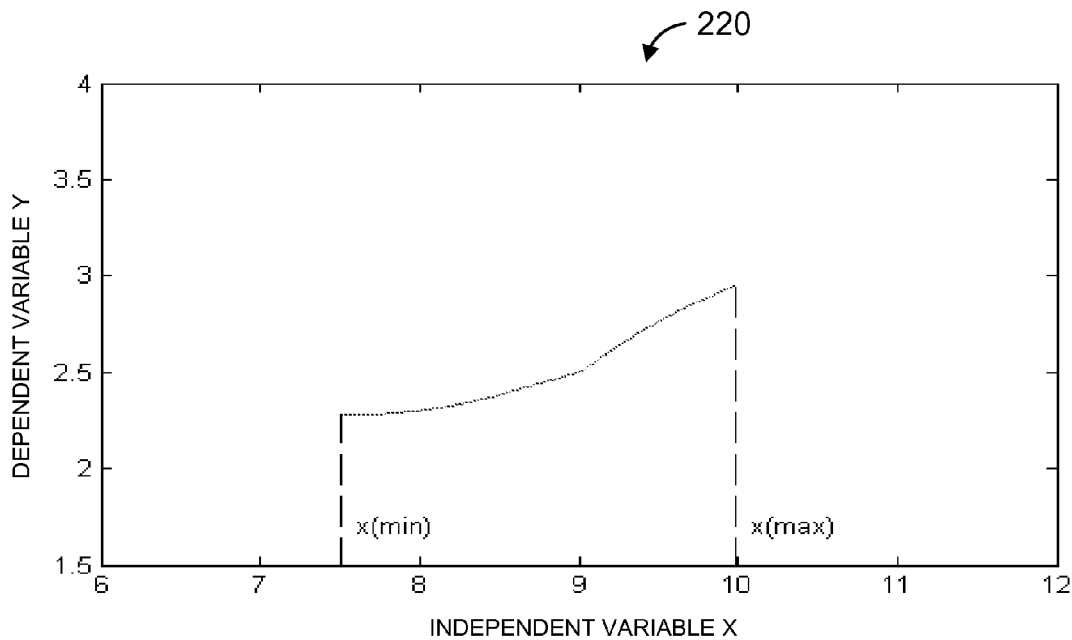
FIG. 9C is a graph showing an updated model and its range of validity.

Referring again to FIG. 10, at a block 320, the validity range may be updated. For example, if $X_{MAX\_1}$ is less than $X_{MIN\_2}$, then $X_{MIN}$ may be set to $X_{MIN\_1}$ and $X_{MAX}$ may be set to $X_{MAX\_2}$ Similarly, if $X_{MAX\_2}$ is less than $X_{MIN\_1}$, then $X_{MIN}$ may be set to $X_{MIN\_2}$ and $X_{MAX}$ may be set to $X_{MAX\_1}$. FIG. 9C illustrates the new model with the new validity range.

Figure 11A:
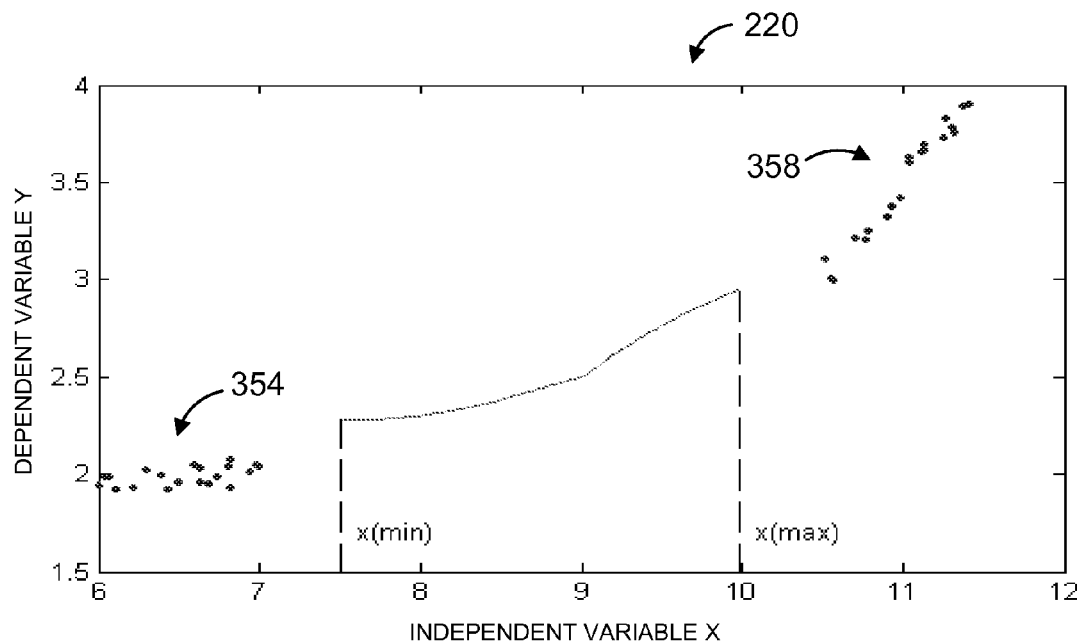
FIG. 11A is a graph showing a plurality of data sets that may be used by the model of FIG. 3 to develop further regression models in different operating regions.
Figure 11B:
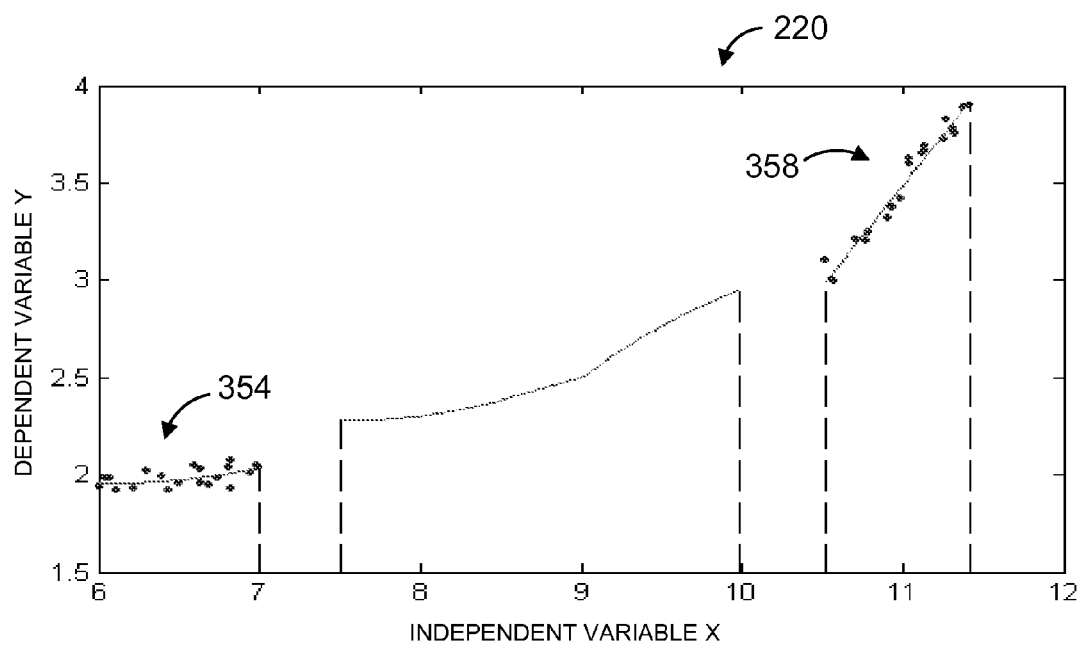
FIG. 11B is a graph showing a further regression models developed using the plurality of data sets of FIG. 11A.
Figure 11C:
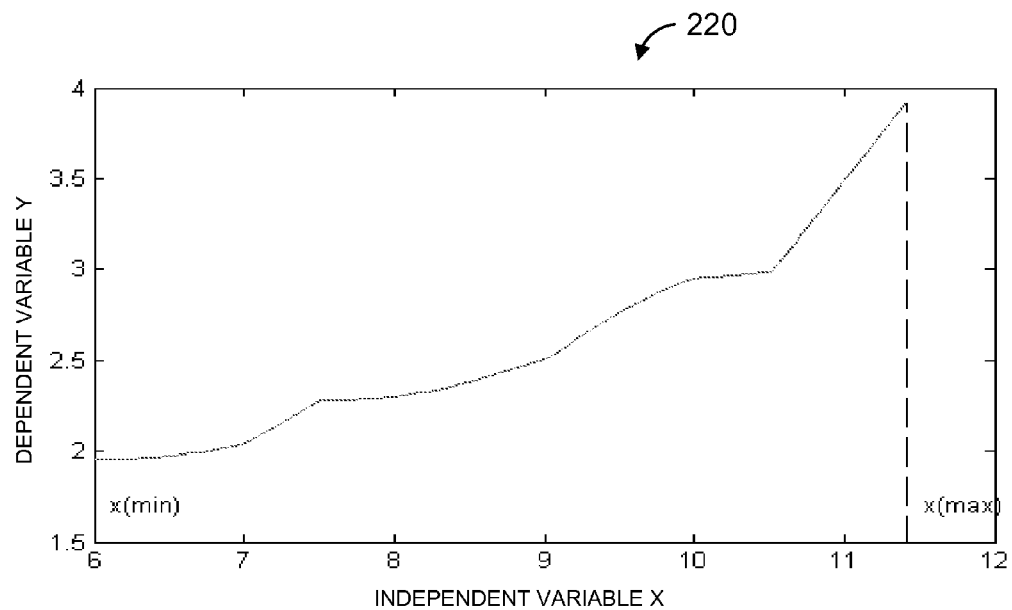
FIG. 11C is a graph showing a further updated model and its range of validity.

Referring now to FIGS. 7 and 10, the model may be updated a plurality of times using a method such as the method 276. For example, FIG. 11A illustrates a first group 354 of data sets and a second group 358 of data sets outside of the validity region corresponding to the model illustrated in FIG. 9C, and FIG. 11B illustrates corresponding to regression models generated for the first group 354 of data sets and the second group 358 of data sets. Additionally, FIG. 11C illustrates a new updated model that includes the regression models generated for the first group 354 of data sets and the second group 358 of data sets as well as new interpolation models. Further, 11C illustrates a new validity range for the model.

The abnormal situation prevention system 35 (FIGS. 1 and 2) may cause, for example, graphs similar to some or all of the graphs illustrated in FIGS. 6A, 6B, 6C, 8A, 8B, 9A, 9B, 9C, 11A, 11B and 11C to be displayed on a display device. For instance, if the AOD system 100 provides model criteria data to the abnormal situation prevention system 35 or a database, for example, the abnormal situation prevention system 35 may use this data to generate a display illustrating how the model 112 is modeling the dependent variable Y as a function of the independent variable X. For example, the display may include a graph similar to one or more of the graphs of FIGS. 6C, 9C and 11C. Optionally, the AOD system 100 may also provide the abnormal situation prevention system 35 or a database, for example, with some or all of the data sets used to generate the model 112. In this case, the abnormal situation prevention system 35 may use this data to generate a display having a graph similar to one or more of the graphs of FIGS. 6A, 6B, 9A, 9B, 11A and 11B. Optionally, the AOD system 100 may also provide the abnormal situation prevention system 35 or a database, for example, with some or all of the data sets that the AOD system 100 is evaluating during its monitoring phase. Additionally, the AOD system 100 may also provide the abnormal situation prevention system 35 or a database, for example, with the comparison data for some or all of the data sets. In this case, as just one example, the abnormal situation prevention system 35 may use this data to generate a display having a graph similar to one or more of the graphs of FIGS. 8A and 8B.

Figure 12:
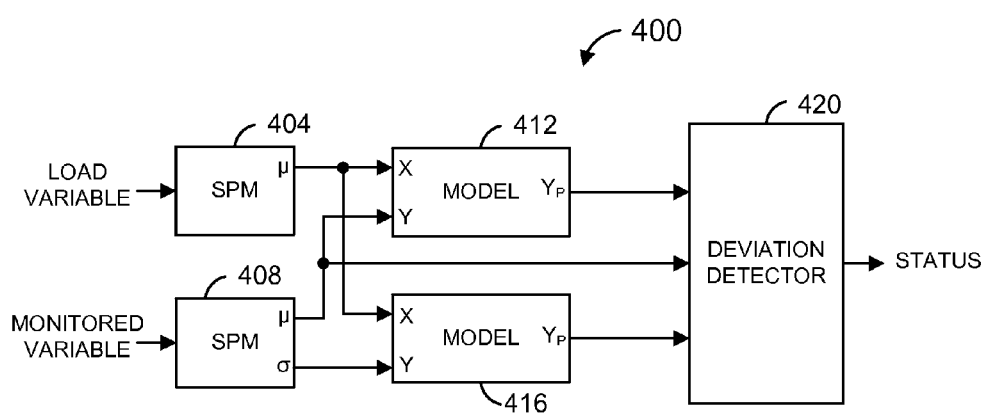
FIG. 12 is another example AOD system that utilizes one or mere regression models.

FIG. 12 is a block diagram of another example AOD system 400 that could be used for the abnormal operation detection blocks 80 and 82 of FIG. 2. The AOD system 400 includes a first SPM block 404 and a second SPM block 408. The SPM block 404 receives a load variable associated with a process and generates a mean signal corresponding to the load variable. Similarly, the SPM block 408 receives a monitored variable associated with the process and generates a mean signal based on the monitored variable. Additionally, the SPM block 408 generates a standard deviation signal based on the monitored variable. The mean signals from the SPM block 404 and the SPM block 408, as well as the standard deviation signal from the SPM block 408 may be generated using a variety of techniques, including known techniques. For example, the SPM block 404 could generate mean values by calculating the means of non-overlapping blocks of load variable samples. The blocks could have a fixed length such as a particular number of samples or a time period. As a particular example used for illustrative purposes, if the block was five minutes in length, the SPM block 404 would generate a mean value every five minutes. The configuration application 38, for example, could be used to configure the SPM blocks 404 and 408. Optionally, the SPM blocks 404 and 408 may not be readily configurable by an operator.

The mean output of the SPM block 404 is provided as an independent variable (X) input of a model 412, and the mean output of the SPM block 408 is provided as a dependent variable (Y) input of the model 412. The model 412 may comprise a model such as the model 112 of FIG. 3, for example. The mean output of the SPM block 404 is also provided as an independent variable (X) input of a model 416, and the standard deviation output of the SPM block 408 is provided as a dependent variable (Y) input of the model 416. The model 416 may comprise a model such as the model 112 of FIG. 3, for example.

In the AOD system 400, the model 412 generally models the mean of the monitored variable as a function of the mean of the load variable. The model 416 generally models the standard deviation of the monitored variable as a function of the mean of the load variable. This may be useful in situations where the standard deviation of the monitored variable tends to change as the load variable changes.

The $Y_P$ outputs of the models 412 and 416 are provided to a deviation detector 420. Additionally, the mean output of the SPM block 408 is provided to the deviation detector 420. The deviation detector 420 generally compares the mean ($\mu_{mv}$) of the monitored variable to the predicted mean ($\mu_{Pmv}$) generated by the model 412. Additionally, the deviation detector 420 utilizes this comparison as well as the predicted standard deviation ($\sigma_{Pmv}$) generated by the model 416 to determine if a significant deviation has occurred. More specifically, the deviation detector 420 generates a status signal as follows:

if $\mu_{mv} > \mu_{Pmv} + m\sigma_{Pmv}$), then generate the status signal indicating that the mean $\mu_{mv}$ appears to be too high ("UP");

if $\mu_{mv} < \mu_{Pmv} - m\sigma_{Pmv}$), then generate the status signal indicating that the mean $\mu_{mv}$ appears to be too low ("DOWN");

otherwise, generate the status signal indicating that the mean $\mu_{mv}$ appears to be in a normal range ("NO CHANGE").

where m is a real number that may be fixed or may be modifiable by a user. As a default, m could be set to 3, for example. Of course, any other suitable default value could be used. The value of m could be configured using the configuration application 38, for example. In some implementations, the status signal may be in the form of an alert or alarm.

In one particular implementation, the AOD system 400 could be implemented as a function block, such as a function block to be used in system that implements a Fieldbus protocol. In another implementation, each of some or all of blocks 404, 408, 412, 416 and 420 maybe implemented as a separate function block.

Using AOD System in a Level Regulatory Control Loop

Figure 13:
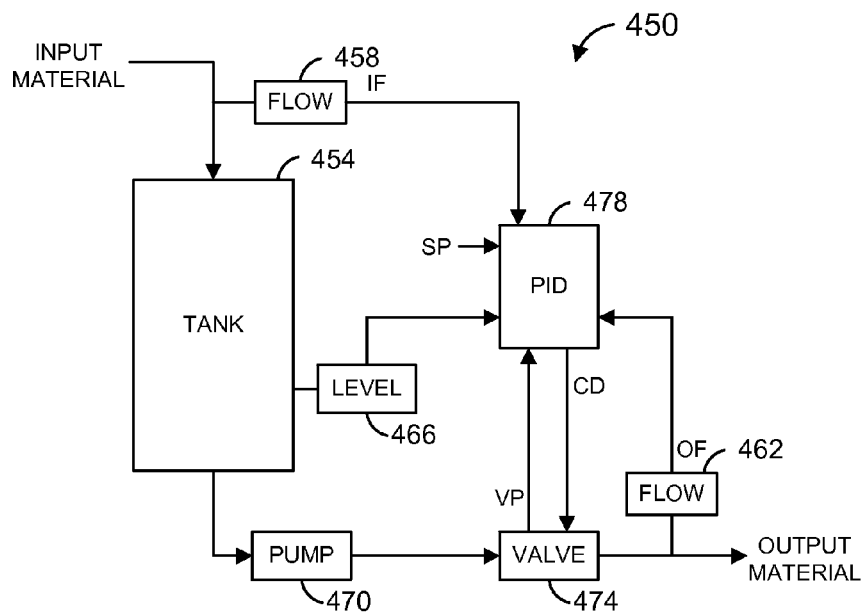
FIG. 13 is a block diagram of an example control system for regulating the level of material in a tank.

AOD systems such as those described above can be used in various ways in a process plant to facilitate abnormal situation prevention. An example of using AOD systems to prevent an abnormal situation in a process plant will be described with reference to FIGS. 13 and 14. FIG. 13 is a block diagram of an example control system 450 for regulating the level of material in a tank 454. A control system such as the control system 450 is often referred to in the process control industry as a Level Regulatory Control Loop. The control system 450 includes a flow sensor 458 to sense the flow of material into the tank 454, and a flow sensor 462 to sense the flow of material exiting the tank 454. The flow sensor 458 may generate a signal IF indicative of the flow rate of material entering the tank 454, for example, and the flow sensor 462 may generate a signal OF indicative of the flow rate of material exiting the tank 454, for example. The control system 450 may also include a level sensor 466 to sense the level of material in the tank 454. The level sensor 466 may generate a signal LVL indicative of the level of material in the tank 454, for example.

A pump 470 may facilitate draining material from the tank 454, and a valve 474 may be used to regulate the flow rate of material exiting the tank. A position of the valve may be altered using a control demand (CD) signal in a manner well known to those of ordinary skill in the art. The valve 474 may include a sensor that generates a signal VP indicative of the position of the valve.

A PID control routine 478 may be used to control the valve 474 in order to regulate the level of material in the tank 454 according to a set point (SP). Any of a variety of suitable control routines may be utilized for the PID control routine 478. In general, such a routine may utilize one or more of the following signals to generate a control demand (CD) signal to appropriately control the valve 454: SP, LVL, VP, IF and/or OF.

In control systems such as the control system 450, two typical abnormal conditions are encountered: a measurement drift and a valve problem. The measurement drift condition may be indicative of a problem with a sensor, such as the level sensor 466. For example, a measurement drift condition may result in the signal LVL not accurately indicating the actual level in the tank 454. The valve problem condition may indicate a problem with the valve 474. This may result, for example, in the VP signal indicating a different valve position than that indicated by the CD signal. With prior art techniques, such underlying problems may cause another problem to occur, such as the level in the tank becoming too high or too low. This may lead to an alert or alarm being generated. But it may take an operator some time to determine the underlying problem that led to the alert/alarm.

One prior art technique for detecting an abnormal condition associated with a control system such as the control system 450 of FIG. 13 will now be described. This technique utilized three process variables: PV, CD and VP. This technique worked only for systems in which the setpoint (SP) was intended to remain constant. If the setpoint (SP) was intentionally changed, the algorithm would need to be re-run. First, a baseline mean ($\mu$) and a baseline standard deviation ($\sigma$), for each of PV, CD and VP, were calculated while the process was known to be in steady state and normally operating. Next, during operation of the process, mean values (MEAN) for each of PV, CD and VP were calculated over non-overlapping windows using SPM blocks.

For each of PV, CD and VP, a state was determined based on MEAN according to Table 1.

TABLE 1

| MEAN of Process Variable | State |
|---|---|
| MEAN < $\mu - 3\sigma$ | DOWN (D) |
| $\mu - 3\sigma \leq$ MEAN $\leq \mu + 3\sigma$ | NO CHANGE (NC) |
| MEAN > $\mu + 3\sigma$ | UP (U) |

Then, based on the states of the MEANs of PV, CD and VP, a diagnostics decision was made according to Table 2.

TABLE 2

| Diagnostics Decision | MEAN of PV | MEAN of CD | MEAN of VP |
|---|---|---|---|
| NORMAL | NC | NC | NC |
| MEASUREMENT DRIFT | NC | U | U |
|  | NC | D | D |
| VALVE PROBLEM | NC | U or D | NC |

As described above, this prior art technique was intended for use in situations in which the process is to remain in a steady state for a relatively long period of time.

Figure 14:
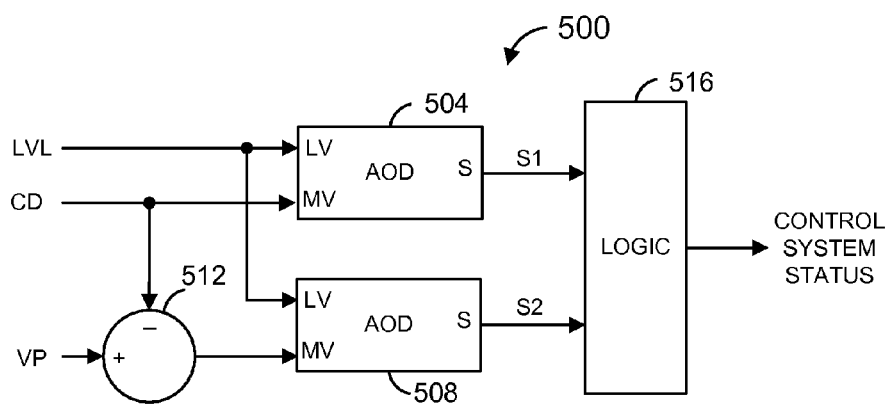
FIG. 14 is a block diagram of an example system that may be used to detect an abnormal condition associated with the control system of FIG. 13.

FIG. 14 is a block diagram of an example system 500 that may be used to detect an abnormal condition associated with the control system 450 of FIG. 13. Some implementations of the system 500 may be more appropriate for use in systems in which, during normal operation, the one or more of SP, LVL, CD and VP may vary over time, for example. It is to be understood, however, that the system 500 could be used with other control systems as well. It is believed that a system such as the system 500 may help to detect a measurement drift or valve problem before such underlying conditions lead to a more serious problem such as a tank level being too high or too low. Thus, the system 500 may help to limit down time because, for example, replacement parts could be ordered in advance of a shut down. Similarly, economic loss may be reduced because a shut down could be scheduled in advance, as opposed to the system being shut down immediately in response to tank level alarm. Alternatively, a faulty sensor or valve could be replaced without shutting the process down.

The system 500 includes a first AOD block 504 and a second AOD block 508. Each of the AOD blocks 504 and 508 may comprise an AOD system such as the AOD system 400 of FIG. 12. Thus, each of the AOD blocks 504 and 508 may include a load variable (LV) input, a monitored variable (MV) input, and a status (S) output as in the AOD system 400 of FIG. 12.

Referring now to FIGS. 13 and 14, the LVL signal may be provided to the LV input of the AOD block 504 and also to the LV input of the AOD block 508. The CD signal may be provided to the MV input of the AOD block 504. The CD signal may also be provided to a subtraction block 512, along with the VP signal. The subtraction block 512 may generate an output signal VP—CD, which may be provided to the MV input of the AOD block 508. In the system 500, the AOD block 504 generally models the mean of the CD signal as a function of the mean of the LVL signal. Similarly, the AOD block 508 generally models the mean of the signal VP—CD as a function of the mean of the LVL signal.

A status signal S1 generated by the AOD block 504 and a status signal S2 generated by the AOD block 508 may be provided to a logic block 516. The signals S1 and S2 may be generated in the manner described with respect to FIG. 12. The logic block 516 may generate a control system status signal that generally indicates whether an abnormal condition has been detected and provides information as to the type of abnormal condition. For example, the logic block 516 may generate an indicator of a valve problem if the status signal S2 has a value of either "UP" or "DOWN". Also, the logic block 516 may generate an indicator of a measurement drift problem if the status signal S2 has a value of "NO CHANGE" and the status signal S1 has a value of either "UP" or "DOWN". If the status signals S1 and S2 both have values of "NO CHANGE," the logic block 516 may generate an indicator that no abnormal condition has been detected.

One of ordinary skill in the art will recognize that a system similar to the system 500 of FIG. 14 could be utilized to detect other types of abnormal conditions associated with a control system such as the control system 450 of FIG. 13. For example, a similar system could be used to detect a liquid leak condition, a head loss condition, etc. Additionally, one of ordinary skill in the art will recognize that systems other than the system 500 can be utilized to detect an abnormal condition associated with the control system 450 of FIG. 13. For example, although of the AOD blocks 504 and 508 may comprise an AOD system such as the AOD system 400 of FIG. 12, other types of AOD systems may be utilized. For instance, other types of models, such as models currently known to those of ordinary skill in the art, may be utilized instead of the models 412 and 416. Thus, any type of model may be utilized that generally can model a dependent variable Y as a function of an independent variable X.

In one particular implementation, the system 500 could be a function block, such as a function block to be used in system that implements a Fieldbus protocol. In another implementation, each of at least some of the blocks 504, 508, 512, and 516 may be implemented as a function block.

Manual Control of AOD System

In the AOD systems described with respect to FIGS. 5, 7 and 10, the model may automatically update itself when enough data sets have been obtained in a particular operating region. However, it may be desired that such updates do not occur unless a human operator permits it. Additionally, it may be desired to allow a human operator to cause the model to update even when received data sets are in the validity region.

Figure 15:
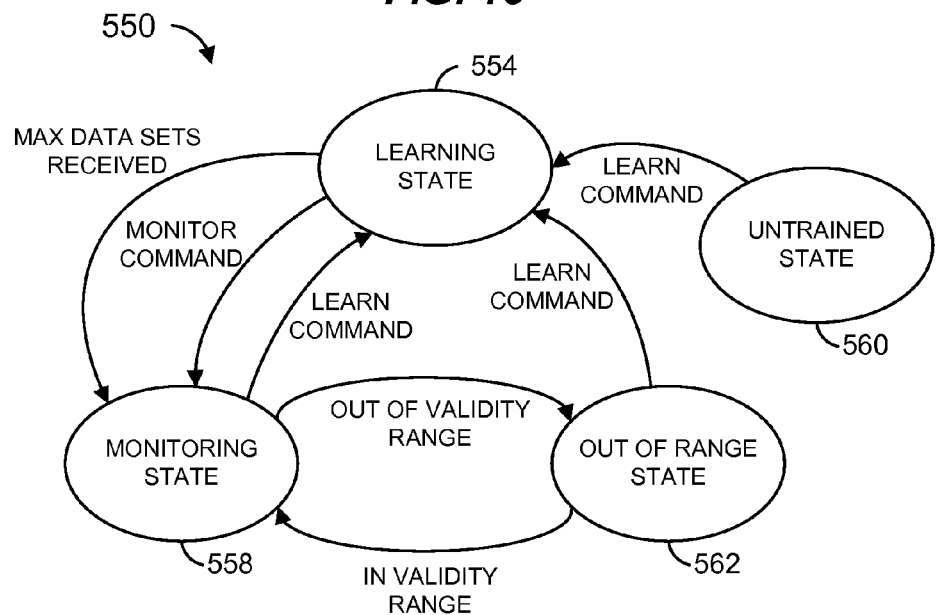
FIG. 15 is an example state transition diagram corresponding to an alternative operation of an AOD system such as the AOD systems of FIGS. 3 and 12.

FIG. 15 is an example state transition diagram 550 corresponding to an alternative operation of an AOD system such as the AOD system 100 of FIG. 3 and AOD system 400 of FIG. 12. The operation corresponding to the state diagram 550 allows a human operator more control over the AOD system. For example, as will be described in more detail below, an operator may cause a LEARN command to be sent to the AOD system when the operator desires that the model of the AOD system be forced into a LEARNING state 554. Generally speaking, in the LEARNING state 554, which will be described in more detail below, the AOD system obtains data sets for generating a regression model. Similarly, when the operator desires that the AOD system create a regression model and begin monitoring incoming data sets, the operator may cause a MONITOR command to be sent to the AOD system. Generally speaking, in response to the MONITOR command, the AOD system may transition to a MONITORING state 558.

An initial state of the AOD system may be an UNTRAINED state 560, for example. The AOD system may transition from the UNTRAINED state 560 to the LEARNING state 554 when a LEARN command is received. If a MONITOR command is received, the AOD system may remain in the UNTRAINED state 560. Optionally, an indication may be displayed on a display device to notify the operator that the AOD system has not yet been trained.

In an OUT OF RANGE state 562, each received data set may be analyzed to determine if it is in the validity range. If the received data set is not in the validity range, the AOD system may remain in the OUT OF RANGE state 562. If, however, a received data set is within the validity range, the AOD system may transition to the MONITORING state 558. Additionally, if a LEARN command is received, the AOD system may transition to the LEARNING state 554.

In the LEARNING state 554, the AOD system may collect data sets so that a regression model may be generated in one or more operating regions corresponding to the collected data sets. Additionally, the AOD system optionally may check to see if a maximum number of data sets has been received. The maximum number may be governed by storage available to the AOD system, for example. Thus, if the maximum number of data sets has been received, this may indicate that the AOD system is, or is in danger of, running low on available memory for storing data sets, for example. In general, if it is determined that the maximum number of data sets has been received, or if a MONITOR command is received, the model of the AOD system may be updated and the AOD system may transition to the MONITORING state 558.

Figure 16:
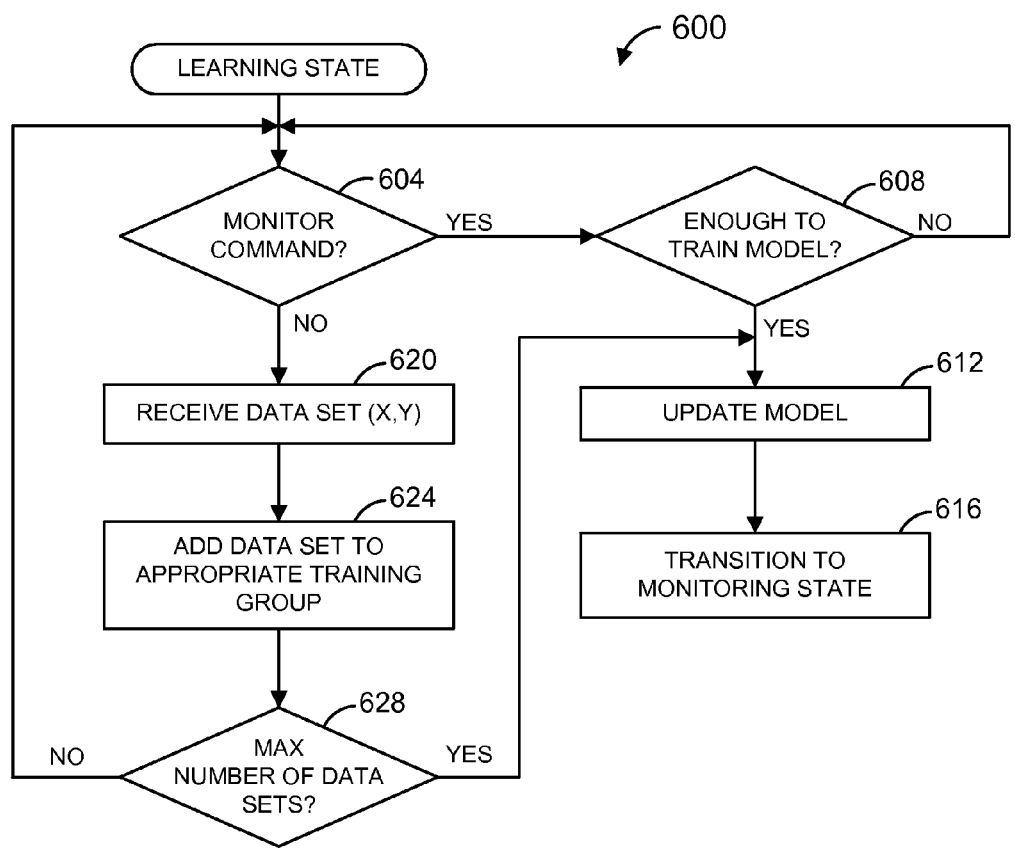
FIG. 16 is a flow diagram of an example method of operation in a LEARNING state of an AOD system.

FIG. 16 is a flow diagram of an example method 600 of operation in the LEARNING state 554. At a block 604, it may be determined if a MONITOR command was received. If a MONITOR command was received, the flow may proceed to a block 608. At the block 608, it may be determined if a minimum number of data sets has been collected in order to generate a regression model. If the minimum number of data sets has not been collected, the AOD system may remain in the LEARNING state 554. Optionally, an indication may be displayed on a display device to notify the operator that the AOD system is still in the LEARNING state because the minimum number of data sets has not yet been collected.

If, on the other hand, the minimum number of data sets has been collected, the flow may proceed to a block 612. At the block 612, the model of the AOD system may be updated as will be described in more detail with reference to FIG. 17. Next, at a block 616, the AOD system may transition to the MONITORING state 558.

If, at the block 604 it has been determined that a MONITOR command was not received, the flow may proceed to a block 620, at which a new data set may be received. Next, at a block 624, the received data set may be added to an appropriate training group. An appropriate training group may be determined based on the X value of the data set, for instance. As an illustrative example, if the X value is less than $X_{MIN}$ of the model's validity range, the data set could be added to a first training group. And, if the X value is greater than $X_{MAX}$ of the model's validity range, the data set could be added to a second training group.

At a block 628, it may be determined if a maximum number of data sets has been received. If the maximum number has been received, the flow may proceed to the block 612, and the AOD system will eventually transition to the MONITORING state 558 as described above. On the other hand, if the maximum number has not been received, the AOD system will remain in the LEARNING state 554. One of ordinary skill in the art will recognize that the method 600 can be modified in various ways. As just one example, if it is determined that the maximum number of data sets has been received at the block 628, the AOD system could merely stop adding data sets to a training group. Additionally or alternatively, the AOD system could cause a user to be prompted to give authorization to update the model. In this implementation, the model would not be updated, even if the maximum number of data sets had been obtained, unless a user authorized the update.

Figure 17:
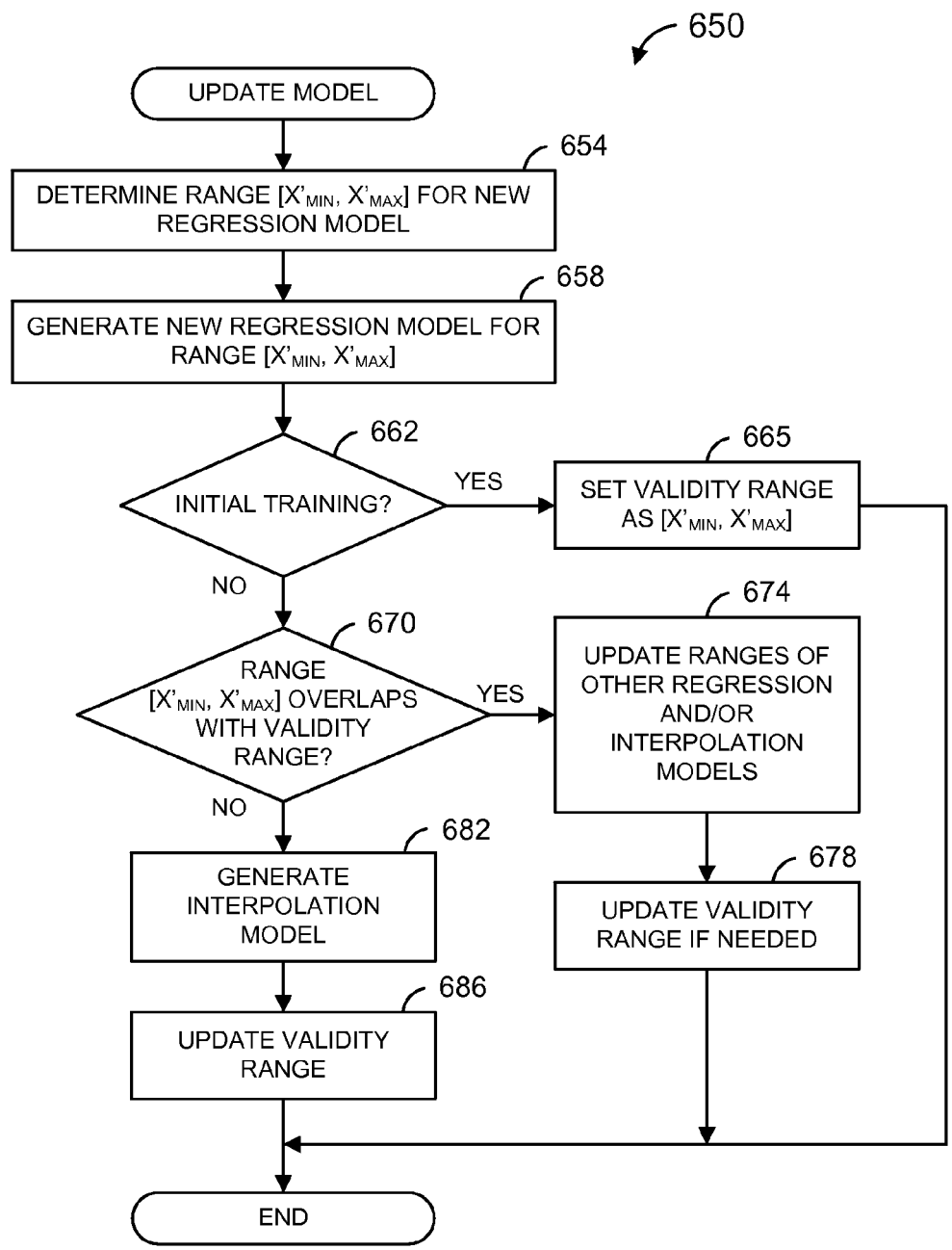
FIG. 17 is a flow diagram of an example method for updating a model of an AOD system.

FIG. 17 is a flow diagram of an example method 650 that may be used to implement the block 612 of FIG. 16. At a block 654, a range [$X'_{MIN}$, $X'_{MAX}$] may be determined for the regression model to be generated using the newly collected data sets. The range [$X'_{MIN}$, $X'_{MAX}$] may be implemented using a variety of techniques, including known techniques. At a block 658, the regression model corresponding to the range [$X'_{MIN}$, $X'_{MAX}$] may be generated using some or all of the data sets collected and added to the training group as described with reference to FIG. 16. The regression model may be generated using a variety of techniques, including known techniques.

At a block 662, it may be determined if this is the initial training of the model. As just one example, it may be determined if the validity range [$X_{MIN}$, $X_{MAX}$] is some predetermined range that indicates that the model has not yet been trained. If it is the initial training of the model, the flow may proceed to a block 665, at which the validity range [$X_{MIN}$, $X_{MAX}$] will be set to the range determined at the block 654.

If at the block 662 it is determined that this is not the initial training of the model, the flow may proceed to a block 670. At the block 670, it may be determined whether the range [$X'_{MIN}$, $X'_{MAX}$] overlaps with the validity range [$X_{MIN}$, $X_{MAX}$]. If there is overlap, the flow may proceed to a block 674, at which the ranges of one or more other regression models or interpolation models may be updated in light of the overlap. Optionally, if a range of one of the other regression models or interpolation models is completely within the range [$X'_{MIN}$, $X'_{MAX}$], the other regression model or interpolation model may be discarded. This may help to conserve memory resources, for example. At a block 678, the validity range may be updated, if needed. For example, if $X'_{MIN}$ is less than $X_{MIN}$ of the validity range, $X_{MIN}$ of the validity range may be set to the $X'_{MIN}$.

If at the block 670 it is determined whether the range [$X'_{MIN}$, $X'_{MAX}$] does not overlap with the validity range [$X_{MIN}$, $X_{MAX}$], the flow may proceed to a block 682. At the block 682, an interpolation model may be generated, if needed. At the block 686, the validity range may be updated. The blocks 682 and 686 may be implemented in a manner similar to that described with respect to blocks 316 and 320 of FIG. 10.

One of ordinary skill in the art will recognize that the method 650 can be modified in various ways. As just one example, if it is determined that the range [$X'_{MIN}$, $X'_{MAX}$] overlaps with the validity range [$X_{MIN}$, $X_{MAX}$], one or more of the range [$X'_{MIN}$, $X'_{MAX}$] and the operating ranges for the other regression models and interpolation models could be modified so that none of these ranges overlap.

Figure 18:
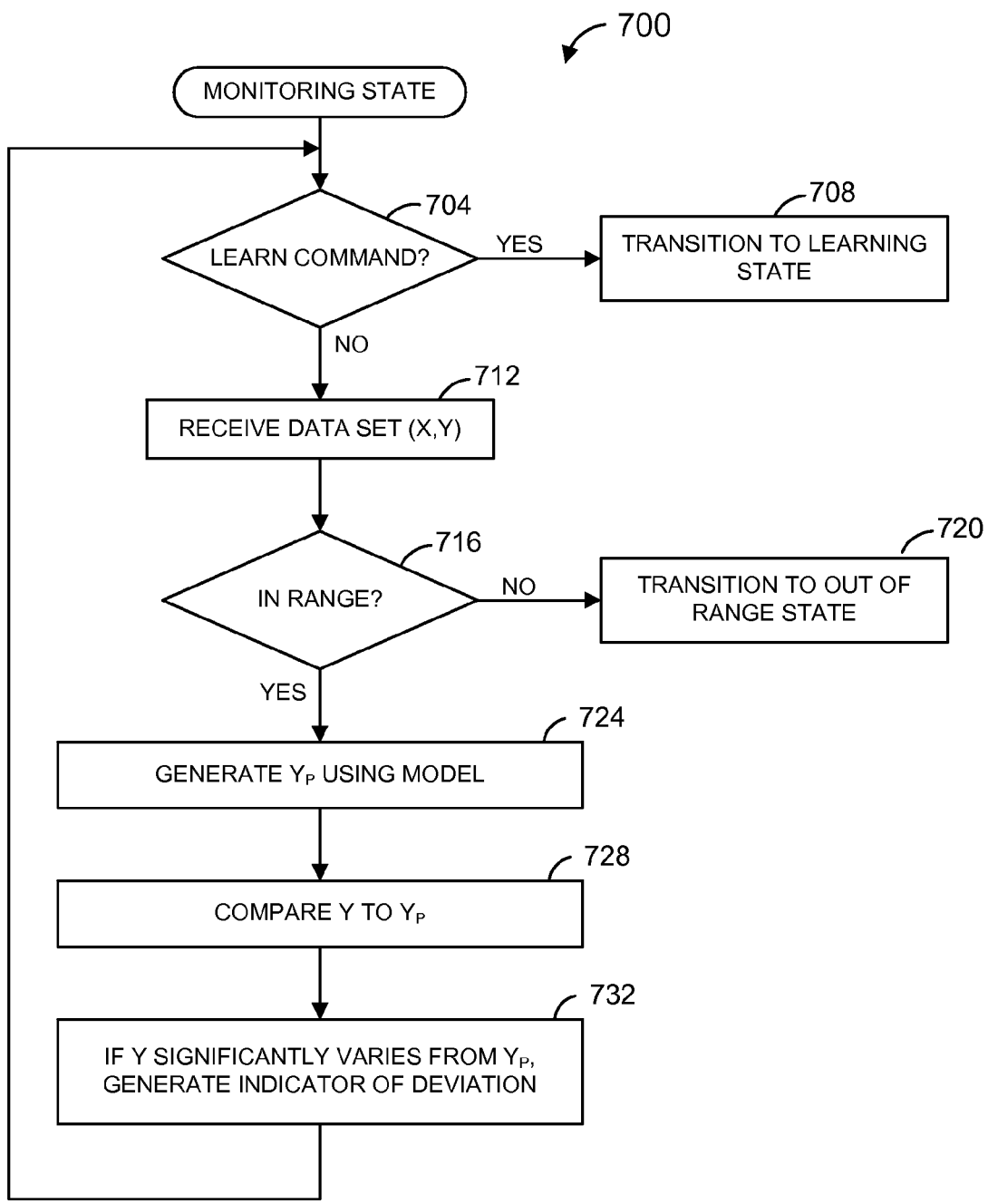
FIG. 18 is a flow diagram of an example method of operation in a MONITORING state of an AOD system.

FIG. 18 is a flow diagram of an example method 700 of operation in the MONITORING state 558. At a block 704, it may be determined if a LEARN command was received. If a LEARN command was received, the flow may proceed to a block 708. At the block 708, the AOD system may transition to the LEARNING state 554. If a LEARN command was not received, the flow may proceed to a block 712.

At the block 712, a data set (X,Y) may be received as described previously. Then, at a block 716, it may be determined whether the received data set (X,Y) is within the validity range [$X_{MIN}$, $X_{MAX}$]. If the data set is outside of the validity range [$X_{MIN}$, $X_{MAX}$], the flow may proceed to a block 720, at which the AOD system may transition to the OUT OF RANGE state 562. But if it is determined at the block 716 that the data set is within the validity range [$X_{MIN}$, $X_{MAX}$], the flow may proceed to blocks 724, 728 and 732. The blocks 724, 728 and 732 may be implemented similarly to the blocks 158, 162 and 166, respectively, as described with reference to FIG. 4.

Figure 19A:
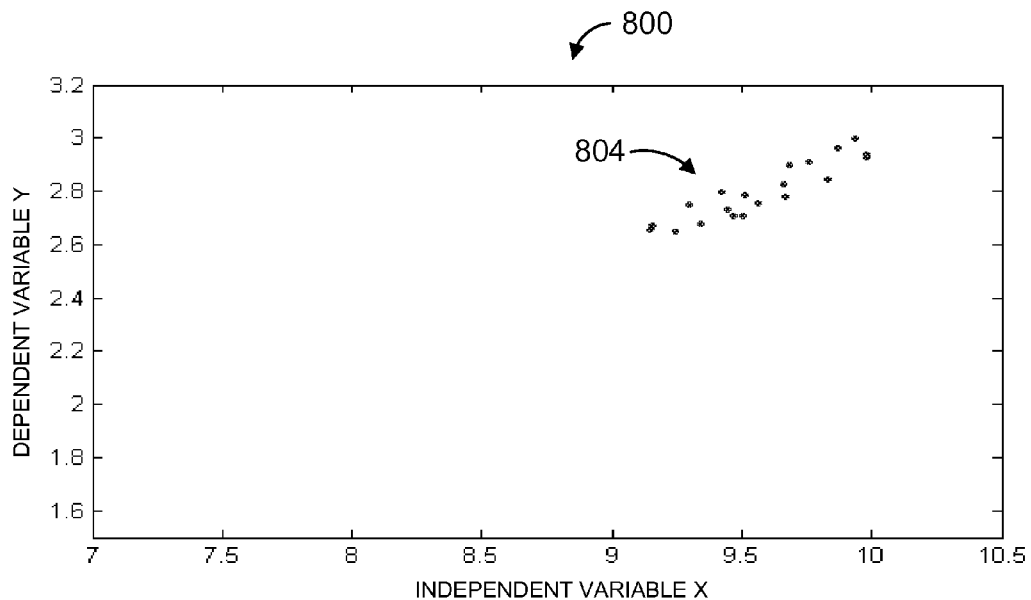
FIG. 19A is a graph showing a plurality of data sets collected during a LEARNING state an AOD system.
Figure 19B:
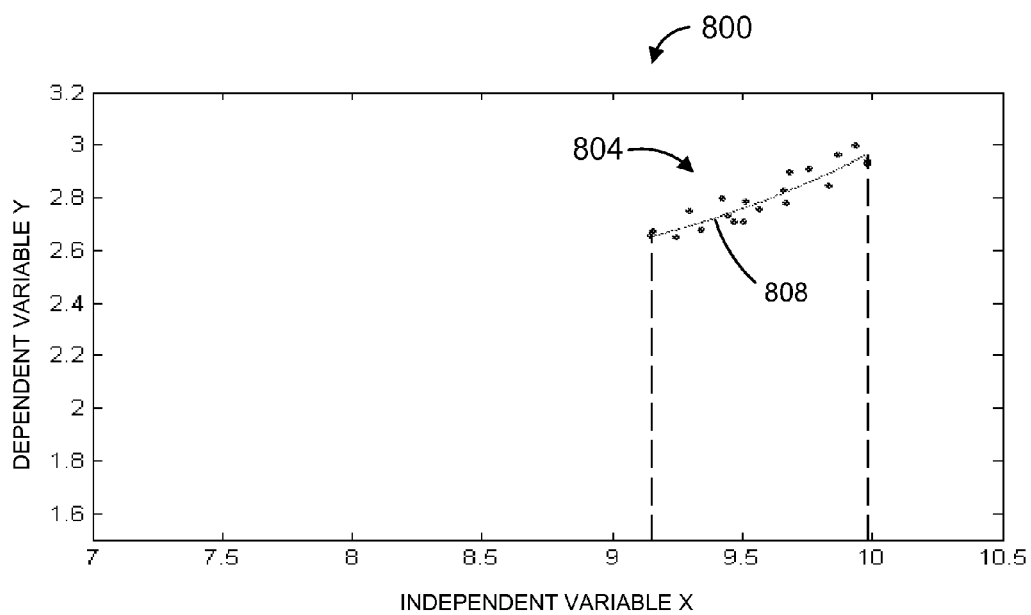
FIG. 19B is a graph showing an initial regression model corresponding to the plurality of data sets of FIG. 19A.

To help further explain state transition diagram 550 of FIG. 15, the flow diagram 600 of FIG. 16, the flow diagram 650 of FIG. 17, and the flow diagram 700 of FIG. 18, reference is now made to FIGS. 19A-19I, which are graphs to help illustrate an example of how an AOD system could operate. FIG. 19A shows a graph 800 illustrating the AOD system in the LEARNING state 554 while its model is being initially trained. In particular, the graph 800 of FIG. 19A includes a group 804 of data sets that have been collected. After an operator has caused a MONITOR command to be issued, or if a maximum number of data sets has been collected, a regression model corresponding to the group 804 of data sets may be generated. The graph 800 of FIG. 19B includes a curve 808 indicative of the regression model corresponding to the group 804 of data sets. Then, the AOD system may transition to the MONITORING state 558.

Figure 19C:
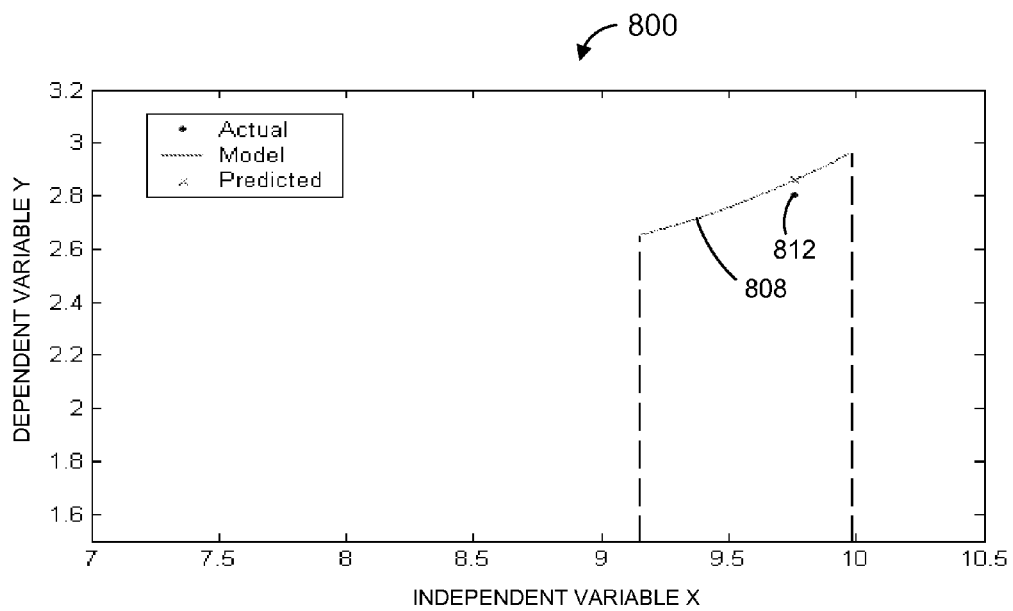
FIG. 19C is a graph showing a received data set and a corresponding predicted value generated during a MONITORING state of an AOD system.
Figure 19D:
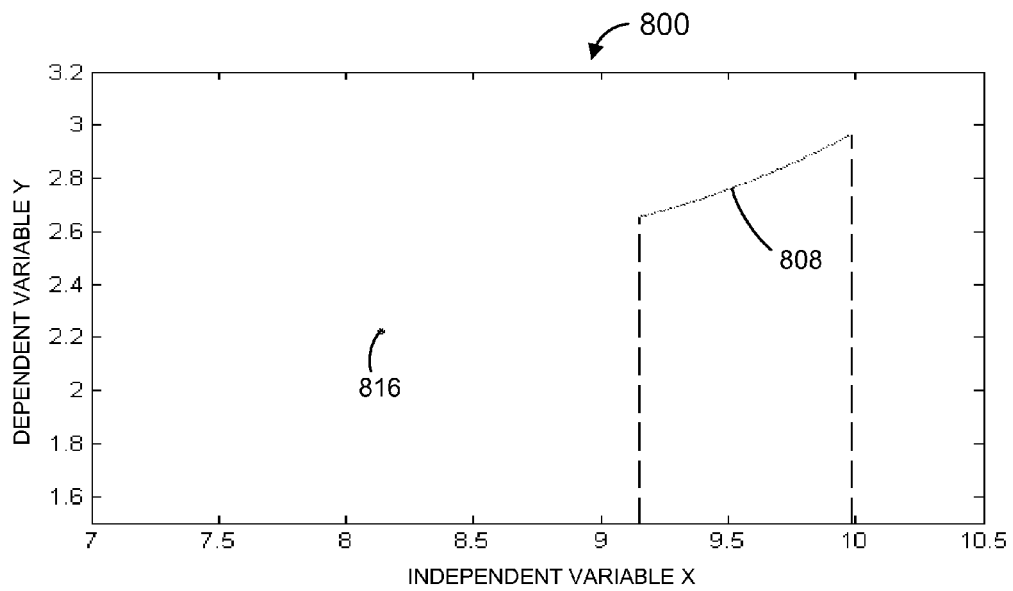
FIG. 19D is a graph showing a received data set that is out of a validity range of a model.

The graph 800 of FIG. 19C illustrates operation of the AOD system in the MONITORING state 558. In particular, the AOD system receives a data set 812 that is within the validity range. The model generates a prediction $Y_P$ (indicated by an x in the graph of FIG. 19C) using the regression model indicated by the curve 808. In FIG. 19D, the AOD system receives a data set 816 that is not within the validity range. This may cause the AOD system to transition to the OUT OF RANGE state 562.

Figure 19E:
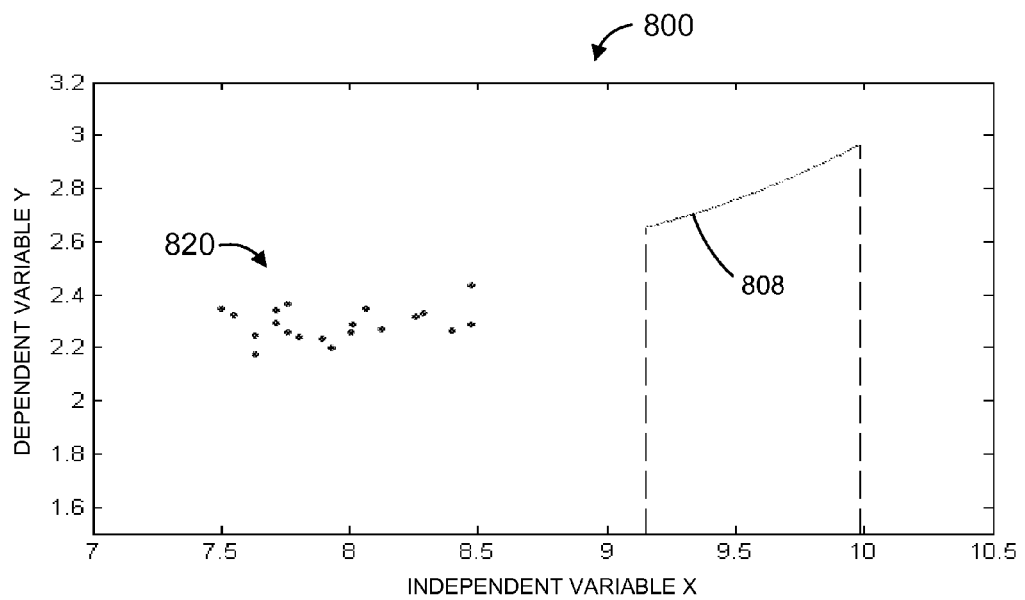
FIG. 19E is a graph showing a plurality of data sets in different operating region collected during a LEARNING state an AOD system.
Figure 19F:
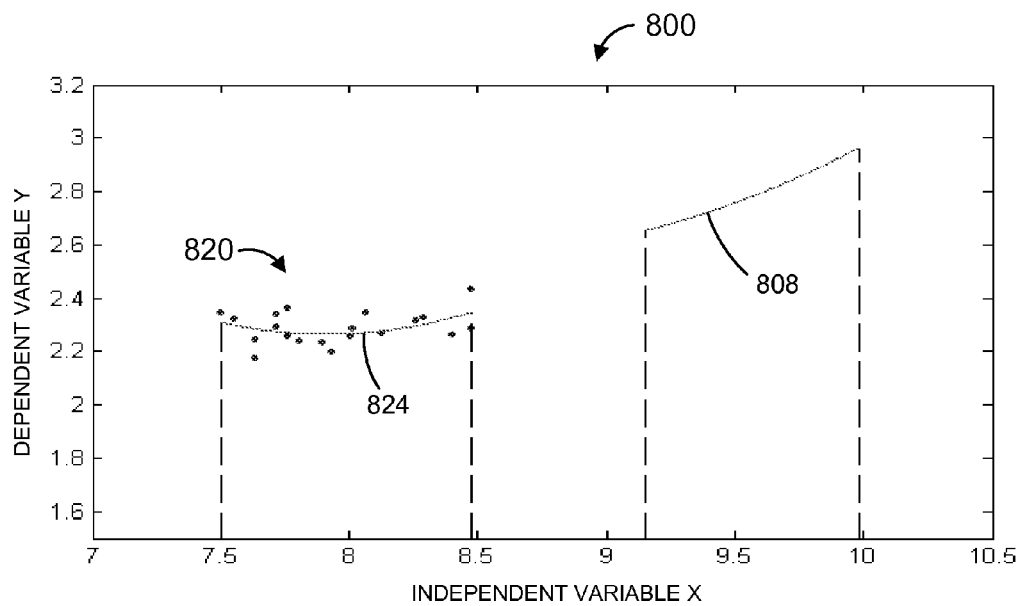
FIG. 19F is a graph showing a second regression model developed using the plurality of data sets of FIG. 19E.

If the operator subsequently causes a LEARN command to be issued, the AOD system will transition again to the LEARNING state 554. The graph 800 of FIG. 19E illustrates operation of the AOD system after it has transitioned back to the LEARNING state 554. In particular, the graph of FIG. 19E includes a group 820 of data sets that have been collected. After an operator has caused a MONITOR command to be issued, or if a maximum number of data sets has been collected, a regression model corresponding to the group 820 of data sets may be generated. The graph 800 of FIG. 19F includes a curve 824 indicative of the regression model corresponding to the group 820 of data sets. Next, an interpolation model may be generated for the operating region between the curves 808 and 824.

Figure 19G:
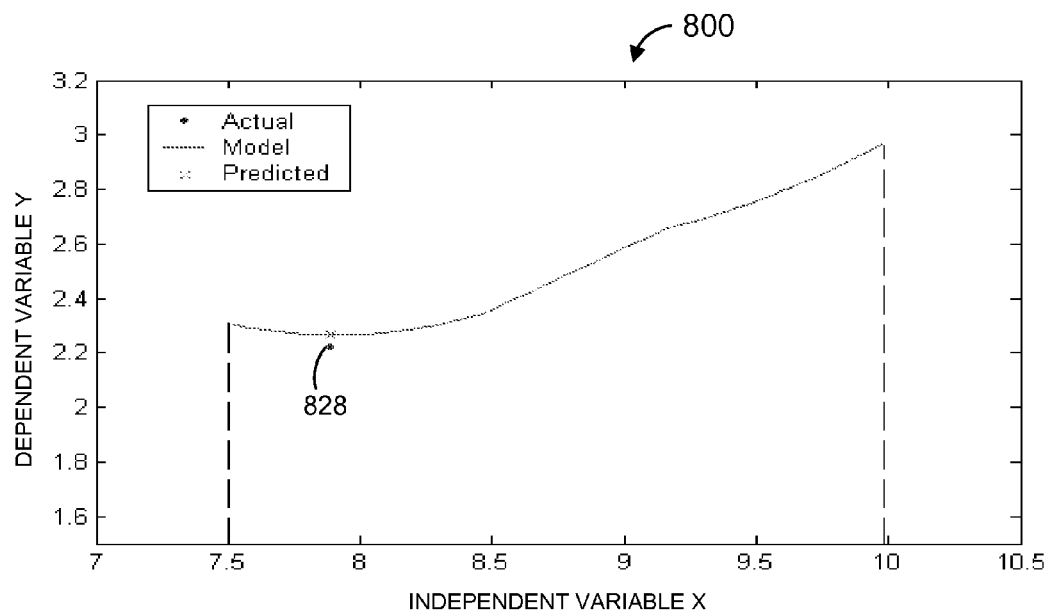
FIG. 19G is a graph showing an updated model and also showing a received data set and a corresponding predicted value generated during a MONITORING state of an AOD system.

Then, the AOD system may transition back to the MONITORING state 558. The graph of FIG. 19G illustrates the AOD system again operating in the MONITORING state 558. In particular, the AOD system receives a data set 828 that is within the validity range. The model generates a prediction $Y_P$ (indicated by an x in the graph of FIG. 19G) using the regression model indicated by the curve 824 of FIG. 19F.

Figure 19H:
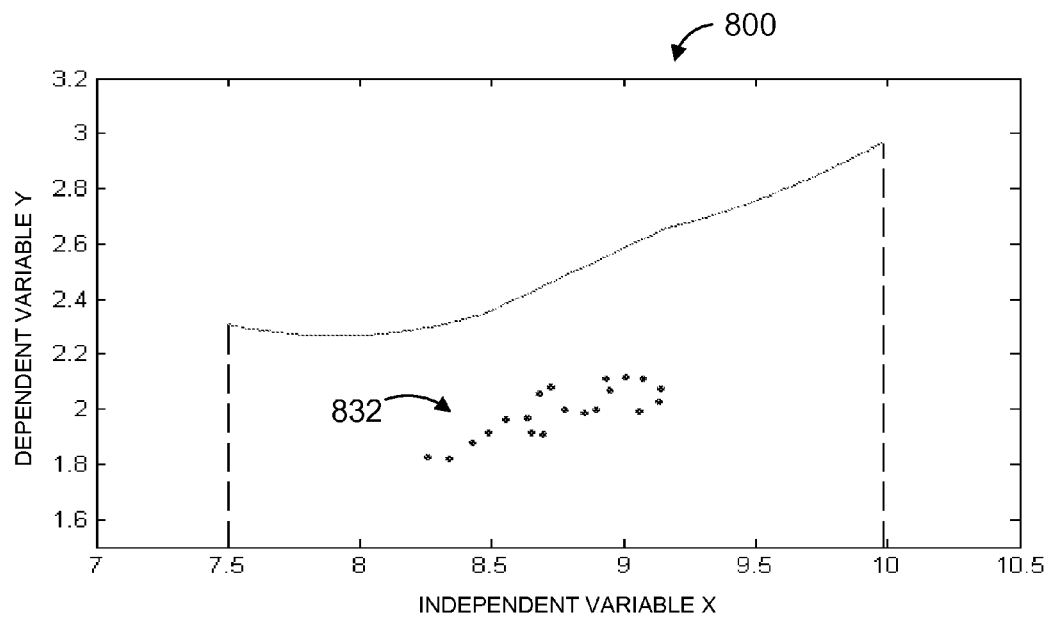
FIG. 19H is a graph showing a plurality of data sets collected during a LEARNING state an AOD system.

If the operator again causes a LEARN command to be issued, the AOD system will again transition to the LEARNING state 554. The graph 800 of FIG. 19H illustrates operation of the AOD system after it has again transitioned to the LEARNING state 554. In particular, the graph of FIG. 19H includes a group 832 of data sets that have been collected. After an operator has caused a MONITOR command to be issued, or if a maximum number of data sets has been collected, a regression model corresponding to the group 832 of data sets may be generated. The graph 800 of FIG. 19I includes a curve 836 indicative of the regression model corresponding to the group 832 of data sets.

Next, ranges of the other regression models may be updated. For example, referring to FIGS. 19F and 19I, the ranges of the regression models corresponding to the curves 808 and 824 have been shortened as a result of adding the regression model corresponding to the curve 836. Additionally, the interpolation model for the operating region between the regression models corresponding to the curves 808 and 824 has been overridden by the regression model corresponding to curve 836. Thus, the interpolation model may be deleted from a memory associated with the AOD system if desired.

Figure 19I:
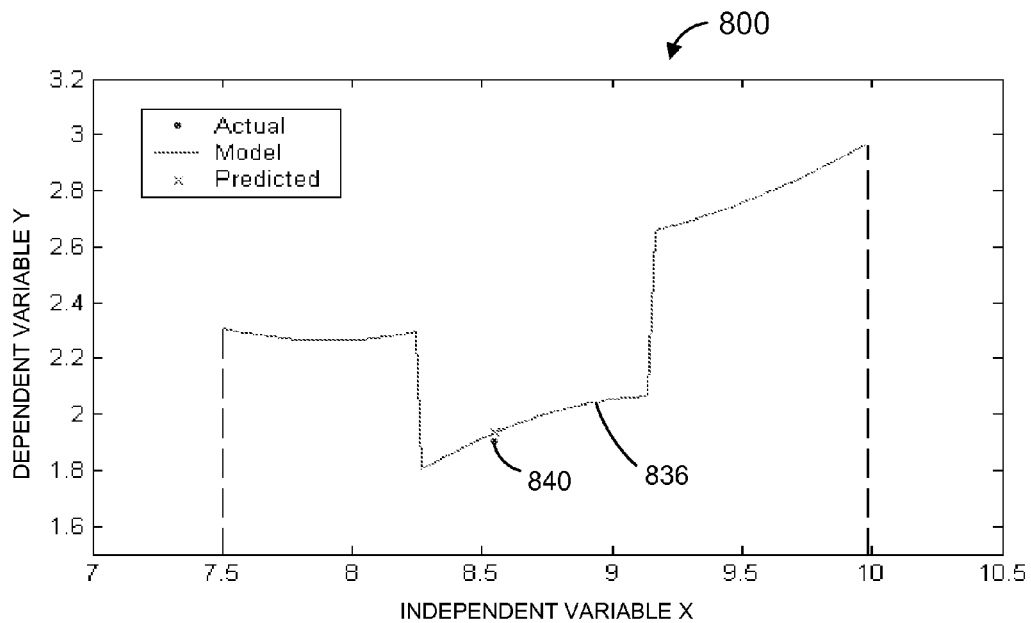
FIG. 19I is a graph showing an updated model developed using the plurality of data sets of FIG. 19H.

After transitioning to the MONITORING state 558, the AOD system may operate as described previously. For example, the graph of FIG. 19I shows a received data set 840 that is within the validity range. The model generates a prediction $Y_P$ (indicated by an x in the graph of FIG. 19I) using the regression model indicated by the curve 836.

Examples of Implementing AOD Systems in One or More Process Plant Devices

Figure 20:
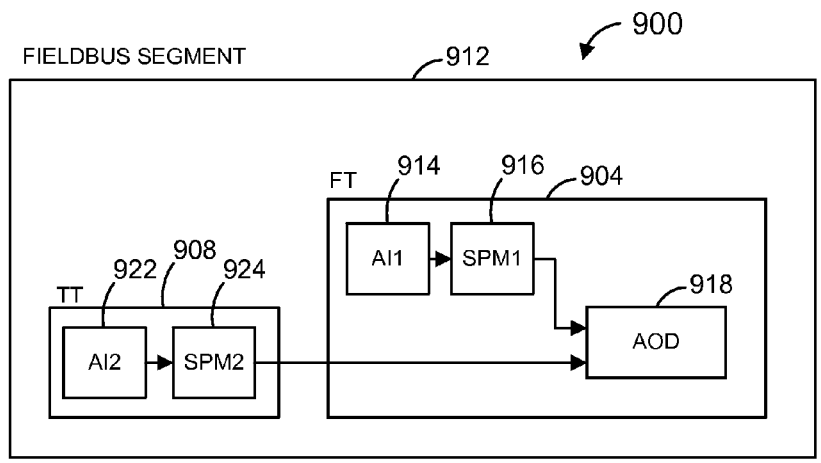
FIG. 20 is a block diagram of yet another example AOD system implemented on a Fieldbus segment of a process plant.

As described previously, AOD systems such as those described herein, may be implemented in a variety of devices within a process plant. FIG. 20 is a block diagram showing one possible way in which an AOD system may be implemented in a process plant. In FIG. 20, a Fieldbus system 900 includes a flow transmitter 904 and a temperature transmitter 908 on a same Fieldbus segment 912. The flow transmitter 904 may implement an analog input function block 914 and an SPM block 916. Additionally, the flow transmitter 904 may implement an abnormal operation detection function block 918. The function block 918 may include at least one model and a deviation detector that function in a manner similar to that described above with respect to FIGS. 3 and/or 12, for example. The temperature transmitter 908 may implement an analog input function block 922 and an SPM block 924.

In operation, the analog input function block 914 may provide a process variable signal to the SPM block 916. In turn, the SPM block 916 may generate one or more statistical signals based on the process variable signal, and may provide the statistical signals to the abnormal operation detection function block 918. Similarly, the analog input function block 922 may provide a process variable signal to the SPM block 924. In turn, the SPM block 924 may generate one or more statistical signals based on the process variable signal, and may provide the statistical signals to the abnormal operation detection function block 918 via the Fieldbus segment 912.

In another implementation, the SPM blocks 916 and 924 may be incorporated within the abnormal operation detection function block 918. In this implementation, the analog input function block 914 may provide its process variable signal to the abnormal operation detection function block 918. Similarly, the analog input function block 922 may provide its process variable signal to the abnormal operation detection function block 918 via the Fieldbus segment 912. Of course, as described above, SPM blocks may not always be utilized in connection with abnormal operation detection function block 918, and thus may be omitted in some implementations.

As is known, some field devices are capable of making sensing of two or more process variables. Such a field device may be capable of implementing all of blocks 914, 916, 918, 922, and 924.

Figure 21:
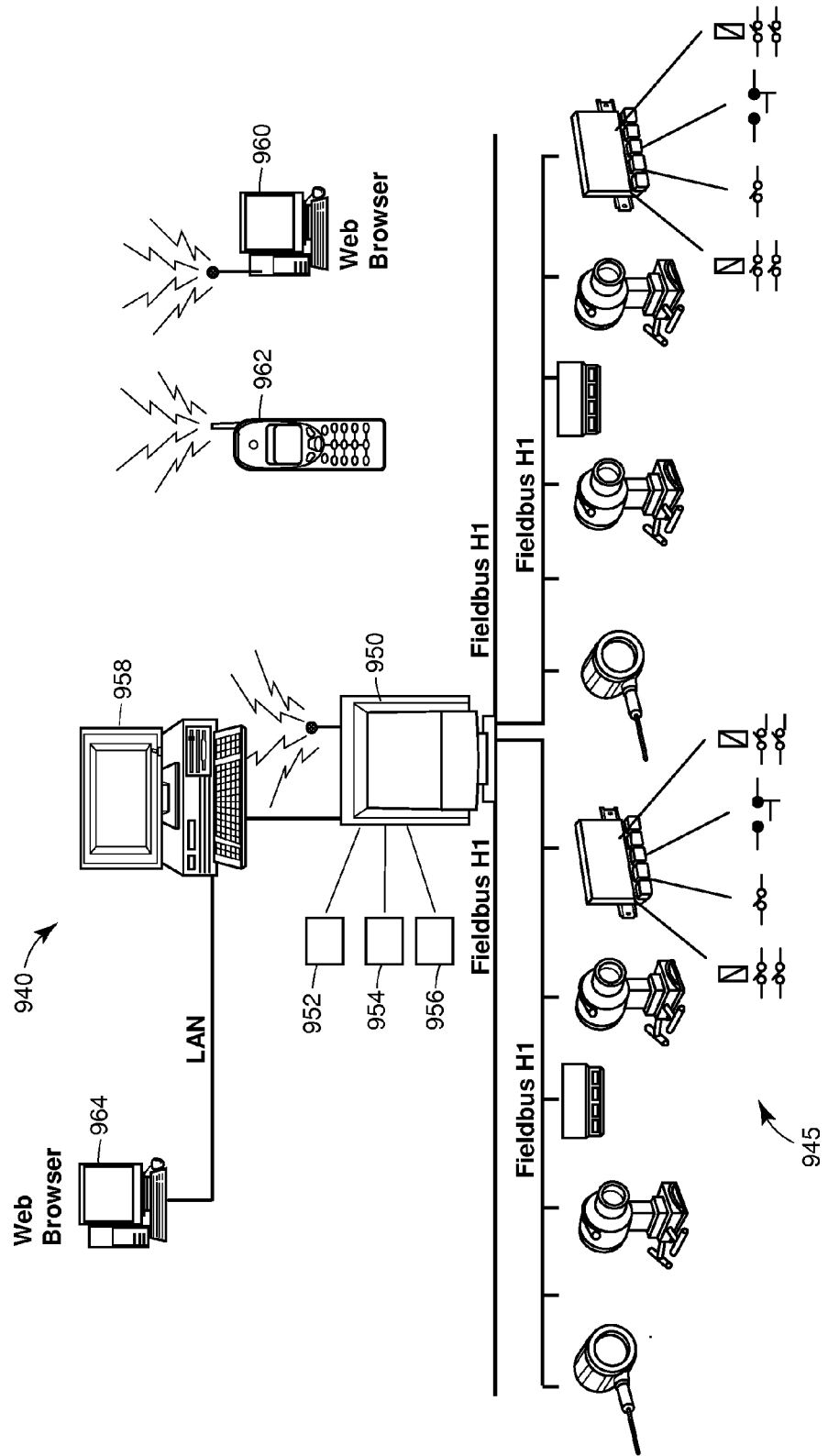
FIG. 21 is a depiction of an interface device connected within a further process plant to facilitate implementation of one or more AOD systems.

FIG. 21 illustrates another manner of implementing AOD systems in a process plant. In the system 940 of FIG. 21, some or all of the abnormal situation prevention application 35, the configuration application 38, and/or the alert/alarm application 43 may be stored in a device other than a host workstation or personal computer. The example system 940 of FIG. 21 includes a set of field devices 945 (illustrated as Fieldbus field devices, but they could be other types of devices as well) connected to an interface device 950, which may be, for example, the Rosemount 3420 device. In this case, the interface device 950, which is not a personal computer, may include some or all of the functionality of the abnormal situation prevention system 35 described above. In particular, the interface device 950 may include a server application 952 to receive and organize data delivered from the field devices 945 (which may be various different types of field devices). If desired, this server application 952 may include an OPC server. The configuration application 38 (or a portion of it) may also be stored in a memory of, and executed on a processor of, the interface device 950 to allow configuration of AOD blocks, SPM blocks, detection logic, models, etc., as described above. Additionally, the interface device 950 may include one or more SPM blocks 954 therein to collect process variable data directly from one or more of the field devices (such as field devices which do not include SPM blocks or functionality) and to generate SPM parameters, as discussed above. Further, the interface device 950 may include one or more AOD blocks 956 therein to receive the SPM parameters and/or process variable data from field devices and to generate indicators of deviation, as discussed above. In this manner, the SPM blocks 954 and/or the AOD blocks 956 stored in and executed in the interface device 950 are able to compensate for the lack of SPM blocks and/or AOD blocks within certain ones of the field devices 945 and may be used to provide SPM data for field devices which do not themselves support SPM blocks or SPM functionality and/or models and deviation detectors for field devices which do not themselves support AOD blocks or AOD functionality. Also, because the interface device 950 may typically have more memory and more processing power than a field device, implementing SPM blocks and/or AOD blocks in the interface device 950 may permit more complex AOD analysis to be performed. For example, more complex regression and/or interpolation models could be implemented as compared to regression models or interpolation models implemented in a field device.

The interface device 950 may communicate with other devices such as a host workstation 958 via a hardwired connection, such as a 2-wire, a 3-wire, a 4-wire, etc. connection, to provide SPM data, or data developed therefrom, such as alerts, data plots, etc. to those devices for viewing by a user. Additionally, as illustrated in FIG. 21, the interface device 950 may be connected via one or more wireless communication connections to a web browser 960 and to a handheld computing device 962, such as a telephone, a personal data assistant (PDA), a laptop computer, etc. In this example, an application may be stored in and executed in other devices, such as the host workstation 958, in the web browser 960 or in the handheld computing device 962 and these applications may communicate with the interface device 950 to obtain data for the application. If desired, the devices 958, 960 and 962 may include the configuration application 38 to enable a user to configure AOD blocks and/or SPM blocks implemented in the interface device 950. Likewise, as illustrated in FIG. 21, the data from the interface device 950 may be accessed indirectly from the host 958 by a web browser 964 and provided to other users via any desired web connection. Of course, the interface device 950 may include a web server therein and may communicate with any other device, such as the devices 958, 960, 962, and 964 using any desired protocol, such as OPC, Modbus; Ethernet, HTML, XML, etc.

Figure 22:
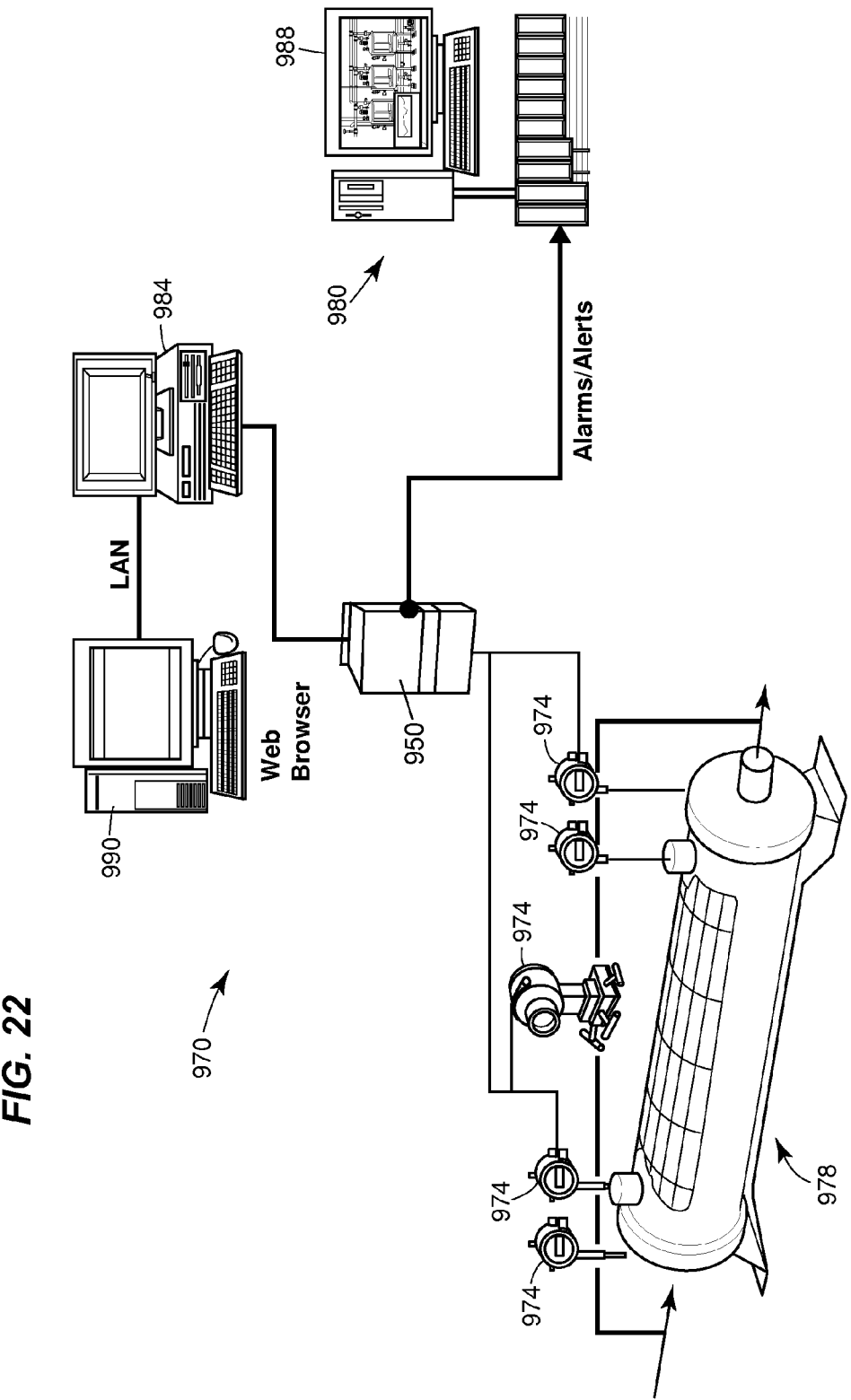
FIG. 22 is a depiction of an interface device connected within still another process plant to facilitate implementation of one or more AOD systems.

FIG. 22 illustrates a further process plant system 970 in which an interface device 950, which may be similar to or the same as that of FIG. 21, is connected between a set of field devices 974 (forming part of a heat exchanger 978) and a process controller system 980. Here, the interface device 950, which may include all of the applications and functionality of the device 950 of FIG. 21, may provide data for viewing to a host 984, and may provide alerts or alarms generated by AOD systems or other systems to the controller system 980. The controller system 980 may integrate these alerts or alarms with other controller type alerts and alarms for viewing by, for example, a control operator at an operator workstation 988. Of course, if desired, the host workstation 984 may include any desired viewing application to view the data collected in and provided by the interface device 950 in any desired manner, including any of those discussed herein. Likewise, this data may be made available for viewing by other users via a web browser 990. Thus, as will be understood, the various applications discussed herein as being associated with the abnormal situation prevention system 35, the SPM blocks (if used), and the AOD systems may be distributed in different devices. For instance, data (such as SPM data) may be collected in one device, such as a field device 974, and sent to another device, such as in the interface device 950, that implements an AOD system. Alerts, alarms, or other indicators generated by the AOD system may be sent to yet another device, such as the workstation 988, for presentation to a user. Likewise, configuration information may be input via a user interface device, such as a host, a web browser, a PDA, etc. and sent to a different device, such as the interface device 950, for configuring an AOD system.

One of ordinary skill in the art will recognize that the example systems and methods described above may be modified in various ways. For example, blocks may be omitted or reordered, additional blocks may be added, etc. For example, with regard to FIG. 16, the block 604 could be implemented at a different point in the flow. Similarly, the block 604 could be implemented as an interrupt routine, and thus it could actually occur at various points with the flow of FIG. 16 depending upon when the MONITOR command is received.

Although examples were described in which a regression model comprised a linear regression model of a single dependent variable as a function of a single independent variable, one of ordinary skill in the art will recognize that other linear regression models and non-linear regression models may be utilized. One of ordinary skill in the art will also recognize that the linear or non-linear regression models may model multiple dependent variables as functions of multiple independent variables.

The AOD systems, models, regression models, interpolation models, deviation detectors, logic blocks, method blocks, etc., described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for detecting abnormal operation associated with a level regulatory control loop, comprising:

generating a first signal associated with regulatory control of a level of material in a tank;

generating a second signal associated with regulatory control of the level of material in the tank;

using a first model to generate a prediction of the second signal as a function of the first signal, the first model including a first regression model in a first range corresponding to a first operating region of the level regulatory control loop and corresponding to a first range of the first signal, the first model capable of being subsequently configured to include at least a second regression model in at least a second respective range corresponding to at least a second respective operating region and corresponding to a second range of the first signal, wherein the first and second ranges of the first signal do not overlap;

determining whether the second signal deviates from the prediction of the second signal to an extent that meets a predetermined condition; and generating a first indicator of an abnormal operation associated with the level regulatory control loop based on whether the second signal deviates from the prediction of the second signal to the extent that meets the predetermined condition.

2. A method according to claim 1, wherein generating the first signal comprises generating a mean of a first process variable associated with regulatory control of the level of material in the tank.

3. A method according to claim 2, wherein generating the second signal comprises generating a mean of a second process variable associated with regulatory control of the level of material in the tank.

4. A method according to claim 3, wherein the first process variable is a signal indicative of the level of material in the tank;

wherein the second process variable is a control demand signal;

wherein generating the first indicator comprises:
generating the first indicator to indicate that the mean of the control demand signal is low if the mean of the control demand signal is lower than the prediction generated by the first model to the extent that meets the predetermined condition; and generating the first indicator to indicate that the mean of the control demand signal is high if the mean of the control demand signal is higher than the prediction generated by the first model to the extent that meets the predetermined condition.

5. A method according to claim 3, wherein the first process variable is a signal indicative of the level of material in the tank;

wherein the second process variable is a difference between a valve position signal and a control demand signal;

wherein generating the first indicator comprises generating the first indicator to indicate a valve problem if the mean of the difference between the valve position signal and the control demand signal deviates from the prediction generated by the first model to the extent that meets the predetermined condition.

6. A method according to claim 1, further comprising:
generating a third signal associated with regulatory control of the level of material in a tank;
using a second model to generate a prediction of the third signal as a function of the first signal; and
determining whether the third signal deviates from the prediction of the third signal to an extent that meets an additional predetermined condition;
wherein generating the first indicator comprises generating the first indicator further based on whether the third signal deviates from the prediction of the third signal to the extent that meets the additional predetermined condition.

7. A method according to claim 6, wherein generating the third signal comprises generating a difference between a fourth signal associated with the level of material in the tank and the second signal.

8. A method according to claim 7, wherein generating the first signal comprises generating a mean of a signal indicative of the level of material in the tank;

wherein generating the second signal comprises generating a mean of a control demand signal;

wherein generating the third signal comprises generating a mean of a difference between a valve position signal and the control demand signal.

9. A method according to claim 8, wherein generating the first indicator comprises:
generating the first indicator to indicate a valve problem if the mean of the difference between the valve position signal and the control demand signal deviates from the prediction generated by the second model to the extent that meets the additional predetermined condition; and generating the first indicator to indicate a measurement drift problem if the mean of the difference between the valve position signal and the control demand signal does not deviate from the prediction generated by the second model to the extent that meets the additional predetermined condition and if the mean of the control demand deviates from the prediction generated by the first model to the extent that meets the predetermined condition.

10. A method according to claim 9, further comprising generating a second indicator of an abnormal operation, wherein generating the second indicator comprises:
generating the second indicator to indicate that the mean of the control demand signal is low if the mean of the control demand signal is lower than the prediction generated by the first model to the extent that meets the predetermined condition;

generating the second indicator to indicate that the mean of the control demand signal is high if the mean of the control demand signal is higher than the prediction generated by the first model to the extent that meets the predetermined condition;

generating the second indicator to indicate that the mean of the control demand signal is not high or low if the mean of the control demand signal does not deviate from the prediction generated by the first model to the extent that meets the predetermined condition;

the method further comprising generating a third indicator of an abnormal operation, wherein generating the third indicator comprises:
generating the third indicator to indicate that the mean of the difference between the valve position signal and the control demand signal is low if the mean of the difference between the valve position signal and the control demand signal is lower than the prediction generated by the second model to the extent that meets the additional predetermined condition;

generating the third indicator to indicate that the mean of the difference between the valve position signal and the control demand signal is high if the mean of the difference between the valve position signal and the control demand signal is higher than the prediction generated by the second model to the extent that meets the additional predetermined condition; and generating the third indicator to indicate that the mean of the difference between the valve position signal and the control demand signal is not high or low if the mean of the difference between the valve position signal and the control demand signal does not deviate from the prediction generated by the second model to the extent that meets the additional predetermined condition.

11. A method according to claim 1, wherein generating the first indicator comprises generating an indicator of a liquid leak condition.

12. A method according to claim 1, wherein generating the first indicator comprises generating an indicator of a head loss condition.

13. A computer readable memory storing machine readable instructions, the machine readable instructions, when executed by one or more machines, to cause the one or more machines to:
  generate a first signal associated with regulatory control of a level of material in a tank;
  generate a second signal associated with regulatory control of the level of material in the tank;
  use a first model to generate a prediction of the second signal as a function of the first signal, the first model including a first regression model in a first range corresponding to a first operating region of the level regulatory control loop and corresponding to a first range of the first signal, the first model capable of being subsequently configured to include at least a second regression model in at least a second respective range corresponding to at least a second respective operating region and corresponding to a second range of the first signal, wherein the first and second ranges of the first signal do not overlap;
  determine whether the second signal deviates from the prediction of the second signal to an extent that meets a predetermined condition; and
  generate an indicator of an abnormal operation associated with the level regulatory control loop based on whether the second signal deviates from the prediction of the second signal to the extent that meets the predetermined condition.

14. A system for detecting an abnormal operation of a level regulatory control loop in a process plant, comprising:
  a processor; and
  a computer readable medium coupled to the processor to store machine readable instructions for execution by the processor;
  a first model implemented by the processor to generate a prediction of a second signal associated with regulatory control of a level of material in a tank as a function of a first signal associated with regulatory control of the level of material in the tank, the first model including a first regression model in a first range corresponding to a first operating region of the level regulatory control loop and corresponding to a first range of the first signal, the first model capable of being subsequently configured to include at least a second regression model in at least a second respective range corresponding to at least a second respective operating region and corresponding to a second range of the first signal, wherein the first and second ranges of the first signal do not overlap;
  a first deviation detector implemented by the processor, the first deviation detector to generate an output indicative of whether the second signal deviates from the prediction of the second signal to an extent that meets a predetermined condition; and
  an indicator generator implemented by the processor, the indicator generator to generate an indicator of an abnormal operation associated with the level regulatory control loop based on whether the second signal deviates from the prediction of the second signal to the extent that meets the predetermined condition.

15. A system according to claim 14, further comprising:
  a first mean generator implemented by the processor to generate the first signal as a mean of a first process variable associated with the level of material in the tank; and
  a second mean generator implemented by the processor to generate the second signal as a mean of a second process variable associated with the level of material in the tank.

16. A system according to claim 15, wherein the first process variable is a signal indicative of the level of material in the tank;
  wherein the second process variable is a control demand signal;
  wherein the first deviation detector is configured to:
    generate the first deviation detector output to indicate whether the mean of the control demand signal is lower than the prediction generated by the first model to the extent that meets the predetermined condition, and
    generate the first deviation detector output to indicate whether the mean of the control demand signal is higher than the prediction generated by the first model to the extent that meets the predetermined condition;
  wherein the indicator generator is configured to:
    generate the indicator to indicate that the mean of the control demand signal is low if the mean of the control demand signal is lower than the prediction generated by the first model to the extent that meets the predetermined condition, and
    generate the indicator to indicate that the mean of the control demand signal is high if the mean of the control demand signal is higher than the prediction generated by the first model to the extent that meets the predetermined condition.

17. A system according to claim 15, wherein the first process variable is a signal indicative of the level of material in the tank;
  wherein the second process variable is a difference between a valve position signal and a control demand signal;
  wherein the indicator generator is configured to generate the indicator to indicate a valve problem if the output of the first deviation detector indicates that the mean of the difference between the valve position signal and the control demand signal deviates from the prediction generated by the first model to the extent that meets the predetermined condition.

18. A system according to claim 14, further comprising:
  a second model implemented by the processor to generate a prediction of a third signal associated with regulatory control of the level of material in the tank as a function of the first signal associated with regulatory control of the level of material in the tank;
  a second deviation detector implemented by the processor, the second deviation detector to generate an output indicative of whether the third signal deviates from the prediction of the third signal to an extent that meets an additional predetermined condition; and
  wherein the indicator generator is coupled to the second deviation detector, and wherein the indicator generator is configured to generate the indicator further based on whether the third signal deviates from the prediction of the third signal to the extent that meets the additional predetermined condition.

19. A system according to claim 18, further comprising:
  a first mean generator implemented by the processor to generate the first signal as a mean of a signal indicative of the level of material in the tank;
  a second mean generator implemented by the processor to generate the second signal as a mean of a control demand signal; and
  a third mean generator implemented by the processor to generate the third signal as a mean of a difference a difference between a valve position signal and the control demand signal.

20. A system according to claim 19, wherein the indicator generator is configured to:
  generate the indicator to indicate a valve problem if the mean of the difference between the valve position signal and the control demand signal deviates from the prediction generated by the second model to the extent that meets the additional predetermined condition, and
  generate the indicator to indicate a measurement drift problem if the mean of the difference between the valve position signal and the control demand signal does not deviate from the prediction generated by the second model to the extent that meets the additional predetermined condition and if the mean of the control demand signal deviates from the prediction generated by the first model to the extent that meets the predetermined condition.

21. A system according to claim 20, wherein the first deviation detector is configured to generate the output of the first deviation detector to indicate whether the mean of the control demand signal is lower than the prediction generated by the first model to the extent that meets the predetermined condition, and to indicate whether the mean of the control demand signal is higher than the prediction generated by the first model to the extent that meets the additional predetermined condition; and
  wherein the second deviation detector is configured to generate the output of the second deviation detector to indicate whether the mean of the difference between the valve position signal and the control demand signal is lower than the prediction generated by the second model to the extent that meets the additional predetermined condition, and to indicate whether the mean of the difference between the valve position signal and the control demand signal is higher than the prediction generated by the second model to the extent that meets the additional predetermined condition.

22. A system according to claim 21, wherein the first deviation detector is configured to generate the output of the first deviation detector to indicate whether the mean of the control demand signal does not deviate from the prediction generated by the first model to the extent that meets the predetermined condition; and
  wherein the second deviation detector is configured to generate the output of the second deviation detector to indicate whether the mean of the difference between the valve position signal and the control demand signal does not deviate from the prediction generated by the second model to the extent that meets the additional predetermined condition.

23. A system according to claim 14, wherein the indicator generator is configured to generate an indicator of a liquid leak condition.

24. A system according to claim 14, wherein the indicator generator is configured to generate an indicator of a head loss condition.

* * * * *

UNITED STATES PATENT AND TRADEMARK OFFICE
CERTIFICATE OF CORRECTION

| | | |
|---|---|---|
| PATENT NO. | : 8,145,358 B2 | Page 1 of 1 |
| APPLICATION NO. | : 11/492577 | |
| DATED | : March 27, 2012 | |
| INVENTOR(S) | : John P. Miller | |

It is certified that error appears in the above-identified patent and that said Letters Patent is hereby corrected as shown below:

In the Specification:

At Column 21, line 40, "maybe" should be -- may be --.

Signed and Sealed this
First Day of October, 2013

Teresa Stanek Rea
*Deputy Director of the United States Patent and Trademark Office*